US012779718B2

(12) United States Patent
Chang

(10) Patent No.: US 12,779,718 B2
(45) **Date of Patent: *Nov. 3, 2026**

(54) RAZOR CARTRIDGE

(71) Applicant: DORCO CO., LTD., Gyeonggi-do (KR)

(72) Inventor: Jun Soo Chang, Seoul (KR)

(73) Assignee: DORCO CO., LTD., Seoul (KR)

( * ) Notice: Subject to any disclaimer, the term of this patent is extended or adjusted under 35 U.S.C. 154(b) by 401 days.

This patent is subject to a terminal disclaimer.

(21) Appl. No.: 17/905,842

(22) PCT Filed: Mar. 9, 2021

(86) PCT No.: PCT/KR2021/002860
§ 371 (c)(1),
(2) Date: Sep. 8, 2022

(87) PCT Pub. No.: WO2021/182830
PCT Pub. Date: Sep. 16, 2021

(65) Prior Publication Data

US 2023/0120418 A1 Apr. 20, 2023

(30) Foreign Application Priority Data

Mar. 10, 2020 (KR) ........................ 10-2020-0029704
Jan. 5, 2021 (KR) ........................ 10-2021-0000763

(51) Int. Cl.
*B26B 21/40* (2006.01)
*B26B 21/28* (2006.01)
(Continued)

(52) U.S. Cl.
CPC .......... *B26B 21/4037* (2013.01); *B26B 21/28* (2013.01); *B26B 21/4025* (2013.01);
(Continued)

(58) Field of Classification Search
CPC . B26B 21/28; B26B 21/4018; B26B 21/4025; B26B 21/4037; B26B 21/42
(Continued)

(56) References Cited

U.S. PATENT DOCUMENTS 2,165,391 A * 7/1939 Lewis ..................... B26B 21/08 30/31
2,171,880 A * 9/1939 Lewis ..................... B26B 21/42 30/31

(Continued)

FOREIGN PATENT DOCUMENTS

CA 2807480 A1 * 3/2012 ......... B26B 21/4037
DE 202004019038 U1 2/1996

(Continued)

OTHER PUBLICATIONS

Korean Intellectual Property Office Application No. 10-2021-0000763, Office Action dated Mar. 17, 2023, 5 pages.

(Continued)

*Primary Examiner* — Jason Daniel Prone
(74) *Attorney, Agent, or Firm* — Knobbe, Martens, Olson & Bear, LLP

(57) ABSTRACT

A razor cartridge includes at least one shaving blade having a cutting edge, a receiving base receiving the at least one shaving blade arranged in a first direction, and a cap covering at least a portion of the receiving base. The razor cartridge also includes a plurality of comb elements, at least some of which are disposed in front of the at least one shaving blade, the comb elements extending toward a front of the receiving base in a second direction that is not perpendicular to the first direction. The plurality of comb elements include a top surface configured to define a shaving plane.

10 Claims, 19 Drawing Sheets

(51) Int. Cl.
*B26B 21/42* (2006.01)
*B26B 21/56* (2006.01)
*B26B 21/20* (2006.01)

(52) U.S. Cl.
CPC .............. *B26B 21/42* (2013.01); *B26B 21/56* (2013.01); *B26B 21/20* (2013.01)

(58) Field of Classification Search
USPC ..... 30/30, 31, 47–51, 233.5; D28/46, 49, 53
See application file for complete search history.

(56) References Cited

U.S. PATENT DOCUMENTS

| | | | | | |
|---|---|---|---|---|---|
| 2,234,440 | A * | 3/1941 | Lewis | B26B 21/08 | 30/30 |
| 2,237,676 | A * | 4/1941 | Lewis | B26B 21/08 | 30/30 |
| 3,183,589 | A * | 5/1965 | Szabo | B26B 21/08 | 30/30 |
| 3,219,180 | A * | 11/1965 | Rosen | B65D 83/10 | 30/34.2 |
| D205,453 | S * | 8/1966 | Christensen | D28/52 | |
| 3,986,258 | A * | 10/1976 | Liedtke | B26B 21/08 | 30/30 |
| 4,335,509 | A * | 6/1982 | Smith | B26B 21/28 | 30/48 |
| 4,346,721 | A * | 8/1982 | Molaro | B26B 21/12 | 132/313 |
| 4,663,841 | A * | 5/1987 | Custer | B26B 21/42 | 30/30 |
| 4,663,843 | A | 5/1987 | Savage | | |
| 4,854,042 | A * | 8/1989 | Byrne | B26B 21/28 | 30/34.1 |
| D312,144 | S * | 11/1990 | Buba | D28/52 | |
| 4,976,028 | A | 12/1990 | Chen | | |
| 5,335,417 | A * | 8/1994 | Genero | B26B 21/40 | 30/41.5 |
| 5,386,750 | A * | 2/1995 | Morrison | B26B 21/42 | 30/31 |
| 5,537,749 | A * | 7/1996 | Cacioppo | B26B 21/40 | 30/41.5 |
| 6,263,576 | B1 * | 7/2001 | Drapak | B26B 21/28 | 30/48 |
| 6,473,970 | B1 * | 11/2002 | Prochaska | B26B 21/222 | 30/50 |
| 6,519,856 | B1 * | 2/2003 | Dischler | B26B 21/28 | 30/48 |
| D541,987 | S * | 5/2007 | Sugawara | D28/46 | |
| D616,147 | S * | 5/2010 | Adams | D28/46 | |
| D616,606 | S * | 5/2010 | Adams | D28/47 | |
| D617,497 | S * | 6/2010 | Goodhead | D28/47 | |
| 7,730,619 | B2 * | 6/2010 | Ozenick | B26B 21/28 | 30/49 |
| D630,377 | S * | 1/2011 | Wattam | D28/53 | |
| 7,918,027 | B2 * | 4/2011 | Colthurst | B26B 21/28 | 30/50 |
| 7,954,244 | B2 * | 6/2011 | Orloff | B26B 21/4018 | 30/50 |
| 8,914,980 | B2 * | 12/2014 | Solomennikov | B26B 21/28 | 30/48 |
| 9,751,226 | B2 * | 9/2017 | Psimadas | B26B 21/4037 | |
| 9,868,220 | B2 * | 1/2018 | Moffat | B26B 21/4037 | |
| 9,919,441 | B2 * | 3/2018 | Drori | B26B 21/4018 | |
| 10,144,142 | B1 * | 12/2018 | Squires | B26B 21/4037 | |
| 10,442,097 | B2 | 10/2019 | Bozikis et al. | | |
| 10,780,596 | B2 * | 9/2020 | Squires | B26B 21/4037 | |
| 10,786,914 | B2 * | 9/2020 | Galanis | B26B 21/4037 | |
| 10,836,060 | B2 * | 11/2020 | Squires | B26B 21/4037 | |
| 10,940,597 | B2 | 3/2021 | Park et al. | | |
| D926,374 | S * | 7/2021 | Washington | D28/47 | |
| 11,173,621 | B2 * | 11/2021 | Squires | B26B 21/42 | |
| 11,400,610 | B2 * | 8/2022 | Moustakas | B26B 21/42 | |
| D964,653 | S * | 9/2022 | Washington | D28/47 | |
| 11,633,869 | B1 * | 4/2023 | Tammera | B26B 21/4037 | 30/32 |
| 11,794,363 | B2 * | 10/2023 | Walker, Jr. | B26B 21/42 | |
| D1,016,392 | S * | 2/2024 | Washington | D28/47 | |
| 11,919,181 | B2 * | 3/2024 | Van Veldhuizen | B26B 21/42 | |
| D1,022,320 | S * | 4/2024 | Fang | D28/47 | |
| 2003/0182802 | A1 * | 10/2003 | Vega | B26B 21/28 | 30/50 |
| 2009/0113715 | A1 * | 5/2009 | Goss-Melendez | B26B 21/28 | 30/50 |
| 2010/0011586 | A1 * | 1/2010 | Nicoll | B26B 21/42 | 30/34.1 |
| 2011/0094108 | A1 * | 4/2011 | Wain | B26B 21/4018 | 30/84 |
| 2011/0162208 | A1 | 7/2011 | Wain | | |
| 2011/0162209 | A1 | 7/2011 | Wain | | |
| 2013/0199346 | A1 | 8/2013 | Psimadas | | |
| 2015/0101196 | A1 * | 4/2015 | Bolivar | B26B 21/28 | 30/50 |
| 2016/0151924 | A1 * | 6/2016 | Gers-Barlag | B26B 21/52 | 30/34.05 |
| 2017/0210020 | A1 | 7/2017 | Bozikis et al. | | |
| 2017/0239826 | A1 * | 8/2017 | Dudkiewicz | B26B 21/28 | |
| 2018/0169879 | A1 * | 6/2018 | Psimadas | B26B 21/42 | |
| 2018/0333879 | A1 * | 11/2018 | Squires | B26B 21/4037 | |
| 2019/0077034 | A1 | 3/2019 | Squires et al. | | |
| 2019/0134833 | A1 | 5/2019 | Kole et al. | | |
| 2019/0202076 | A1 | 7/2019 | Park et al. | | |
| 2019/0299460 | A1 * | 10/2019 | Lechuga | B26B 21/4018 | |
| 2020/0039097 | A1 | 2/2020 | Bozikis et al. | | |
| 2022/0072725 | A1 * | 3/2022 | Drori | B26B 21/4037 | |
| 2023/0166422 | A1 * | 6/2023 | Chang | B26B 21/4037 | |
| 2026/0097531 | A1 * | 4/2026 | Buntman | B26B 21/4037 | |

FOREIGN PATENT DOCUMENTS

| | | | | |
|---|---|---|---|---|
| FR | 2612112 A1 * | 9/1988 | B26B 21/28 |
| KR | 20-0166341 | 2/2000 | |
| KR | 10-2013-0111549 | 10/2013 | |
| KR | 10-2017-0041246 | 4/2017 | |
| KR | 10-1876232 | 7/2018 | |
| WO | WO 96/02370 A1 | 8/2005 | |
| WO | WO 2020/205914 A1 | 10/2020 | |

OTHER PUBLICATIONS

PCT International Application No. PCT/KR2021/002860, International Search Report dated Aug. 4, 2021, 6 page.
Extended European Search Report in Application No. 21767985.1, mailed Nov. 17, 2023, 8 pages.
International Search Report Issued in International Patent Application No. PCT/KR2021/002861, malled Aug. 4, 2021 in 6 pages.
Extended European Search Report in Application No. 21766951.4, mailed Nov. 17, 2023, 8 pages.
Office Action received in European Application No. 21767985.1 dated Apr. 17, 2025.
Office Action received in European Application No. 21766951.4 dated Apr. 17, 2025.
Office Action dated Oct. 22, 2025 in European Application No. 21767985.1, in 6 pages.

* cited by examiner

RAZOR CARTRIDGE

CROSS-REFERENCE TO RELATED APPLICATION(S)

This application is the National Stage filing under 35 U.S.C. 371 of International Application No. PCT/KR2021/002860, filed on Mar. 9, 2021, which claims the benefit of earlier filing date and right of priority to Korean Application Nos. 10-2020-0029704, filed on Mar. 10, 2020, and 10-2021-0000763, filed on Jan. 5, 2021, the contents of which are all hereby incorporated by reference herein in their entireties.

TECHNICAL FIELD

The present disclosure relates to a razor cartridge.

BACKGROUND ART

The content described in this section merely provides the background information on the present disclosure and does not constitute the prior art.

Recently, to emphasize masculine beauty or afford a good style, shaving which leaves a certain length of hair without completely cutting the hair is in fashion. This is called stubble shaving, which is distinguished from general shaving completely or almost completely cutting the hair. Currently, various stubble razors for stubble shaving are on the market.

Some of conventional stubble razors are configured to operate electrically. Such a conventional electric stubble razor provides a shaving function in a state where it is connected by an electric wire or in a state where a battery is charged.

To this end, the conventional electric stubble razor includes therein electronic components such as a battery or a small motor. Thus, the conventional electric stubble razor is disadvantageous in that the volume of the razor is large and it is difficult to carry.

US Patent Laid-Open Publication No. 2019-0077034 (hereinafter, referred to as Patent Document 1), which is directed to one of different conventional stubble razors, is configured such that a trimming cover is attached to a general wet razor.

To be more specific, the razor shown in Patent Document 1 is configured to be used as the general wet razor in a state where the trimming cover is detached, and to be used as the stubble razor in a state where the trimming cover is attached.

On the other hand, the stubble shaving cuts relatively long hair. Therefore, in the stubble shaving, the hair may be cut in a relatively laid-down position compared to the general shaving. Further, the stubble shaving has a feature that a shaving plane and a cutting edge of a shaving blade are relatively far away. That is, the stubble shaving has a feature different from that of the general shaving.

In other words, the stubble razor needs to be designed such that the feature of the stubble shaving is well reflected for effective stubble shaving. However, since the stubble razor of Patent Document 1 also functions as the general wet razor, the feature of the stubble shaving is not reflected. Therefore, there is a need to develop a new kind of wet stubble razor capable of providing effective stubble shaving.

DOCUMENTS OF RELATED ART (Patent Document 1) US Patent Laid-Open Publication No. 2019-0077034 (Mar. 14, 2019)

DISCLOSURE

Technical Problem

Accordingly, the present disclosure is to provide a razor cartridge capable of providing effective stubble shaving by well reflecting the features of stubble shaving.

Technical Solution

According to at least one embodiment, the present disclosure provides a razor cartridge comprising: at least one shaving blade having a cutting edge; a receiving base receiving the at least one shaving blade arranged in a first direction; a cap covering at least a portion of the receiving base; and a plurality of comb elements, at least some of which are disposed in front of the at least one shaving blade, the comb elements extending toward a front of the receiving base in a second direction that is not perpendicular to the first direction, wherein the plurality of comb elements comprise a top surface configured to define a shaving plane.

Advantageous Effects

In accordance with the embodiment of the present disclosure, a razor cartridge is capable of providing effective stubble shaving.

MODE FOR DISCLOSURE

Figure 1:
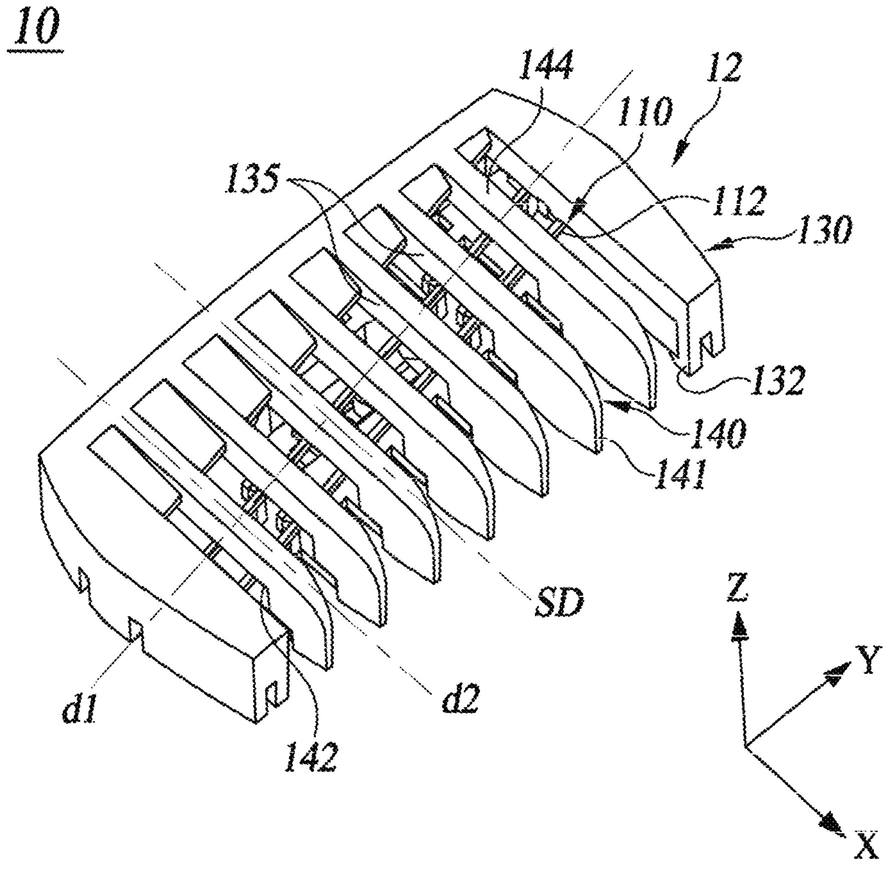
FIG. 1 is a perspective view illustrating a razor cartridge according to an embodiment of the present disclosure.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

FIG. 1 is a perspective view illustrating a razor cartridge 10 according to an embodiment of the present disclosure.

Figure 2:
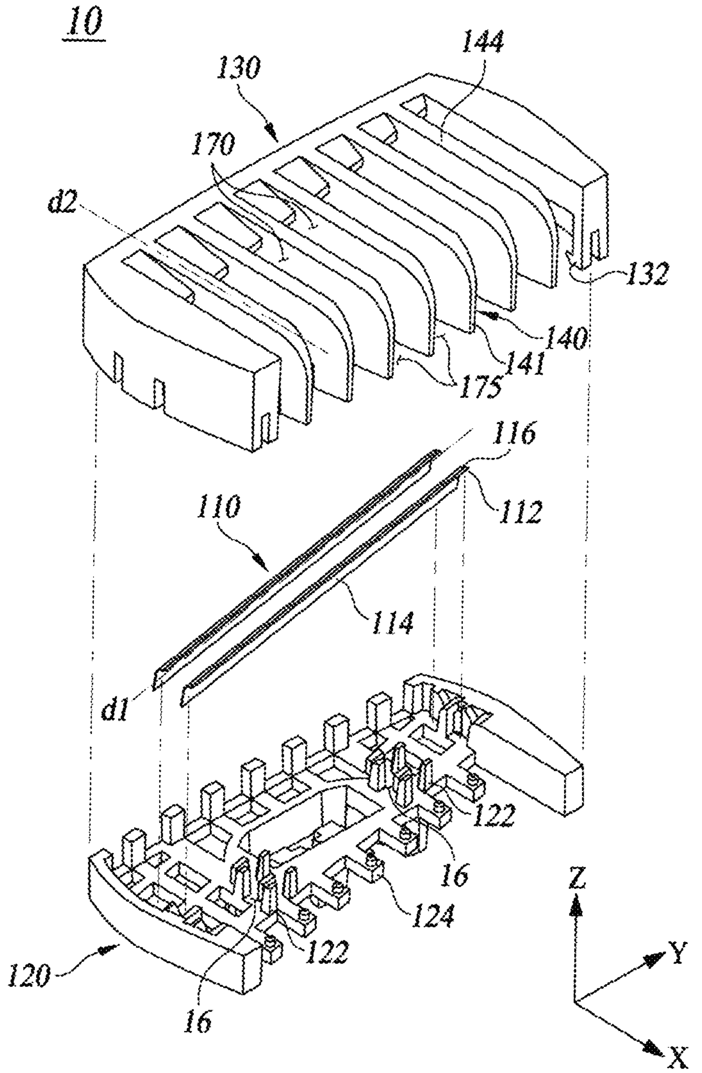
FIG. 2 is an exploded perspective view illustrating the razor cartridge according to an embodiment of the present disclosure.

FIG. 2 is an exploded perspective view illustrating the razor cartridge 10 according to an embodiment of the present disclosure.

Referring to FIGS. 1 and 2, the razor cartridge 10 may include a blade housing 12 and at least one shaving blade 110.

The blade housing 12 may form the appearance of the razor cartridge 10, and may accommodate at least one shaving blade 110 therein.

The blade housing 12 may include a receiving base 120, a cap 130, and a plurality of comb elements 140.

At least one shaving blade 110 may have a cutting edge 112 for cutting the hair.

At least one shaving blade 110 may be accommodated in the blade housing 12 while being arranged in a first direction d1. In this case, the first direction d1 may not be perpendicular to a shaving direction SD. Here, the shaving direction SD refers to a direction in which the razor cartridge 10 moves, during the shaving. For example, the shaving direction SD may be parallel to the direction of an X-axis of FIG. 1.

The razor cartridge 10 according to an embodiment of the present disclosure has a technical feature capable of providing effective stubble shaving, by diagonally arranging at least one shaving blade 110. This will be described in detail with reference to FIGS. 9A, 9B, 10A and 10B.

Turning back to FIGS. 1 and 2, at least one shaving blade 110 may include a bending blade or a welded blade. The bending blade and the welded blade each include a bent area, whereas a straight blade does not include a bent area.

Therefore, the razor cartridge 10 according to an embodiment of the present disclosure does not need a spacer for spacing the cutting edge from a base member. Thereby, the razor cartridge 10 may have a simpler configuration. However, the present disclosure is not limited thereto. For example, at least one shaving blade 110 may include the straight blade.

The receiving base 120 may receive at least one shaving blade 110 arranged in the first direction d1.

The receiving base 120 may include a plurality of pairs of receiving protrusions 122 for receiving or at least partially accommodating at least one shaving blade 110. The plurality of pairs of receiving protrusions 122 may be arranged in the first direction d1 on a surface of the receiving base 120 that is adjacent to at least one shaving blade 110. Each pair of the plurality of pairs of receiving protrusions 122 is spaced apart to define a gap 16 therebetween, the gap extending in the second direction, and the gaps of the plurality of pairs of receiving protrusions define a first portion 16 of the at least one receiving hole.

The plurality of receiving protrusions 122 may support a base portion 114 of at least one shaving blade 110.

To be more specific, the base portion 114 may be disposed between the receiving protrusion 122 disposed in front of the base portion 114 and the receiving protrusion 122 disposed in back of the base portion 114, and may be supported by each receiving protrusion 122.

In this way, at least one shaving blade 110 may be disposed in a space where the receiving protrusions 122 are formed, and then may be assembled on the receiving base 120.

On the other hand, the extension direction of the plurality of receiving protrusions 122 may be substantially perpendicular to a surface of the receiving base 120. However, the present disclosure is not limited thereto.

For example, the plurality of receiving protrusions 122 may extend in a direction that is not perpendicular to a surface of the receiving base 120, according to a direction in which the base portion 114 is received on the receiving base 120.

The razor cartridge 10 according to an embodiment of the present disclosure does not require a separate spacer for spacing neighboring shaving blades from each other, because the plurality of receiving protrusions 122 is disposed on the receiving base 120. Therefore, the razor cartridge 10 according to an embodiment of the present disclosure may reduce the number of components in manufacturing by injecting the receiving base 120 and the receiving protrusion 122 together, thus having a manufacturing advantage.

The cap 130 may cover at least a portion of the receiving base 120 in a state where the receiving base 120 receives at least one shaving blade 110.

For example, a coupling hook 132 formed on a side of the cap 130 may be configured to be coupled to a side of the receiving base 120 through hook coupling. However, the present disclosure is not limited thereto, but the cap 130 and the receiving base 120 may be configured to be coupled to each other through other coupling methods.

The cap 130 may support both ends of at least one shaving blade 110. Thereby, at least one shaving blade 110 may be firmly maintained in the blade housing 12.

The plurality of comb elements 140 may extend toward the front of the receiving base 120, and at least some of the plurality of comb elements 140 may be disposed in front of at least one shaving blade 110.

The plurality of comb elements 140 may arrange a user's hair using a space between the comb elements 140 during shaving. To be more specific, the plurality of comb elements 140 may include head portions (or forward portions of second surfaces) 141 formed on free ends of the plurality of comb elements 140. Referring to FIG. 2, the plurality of comb elements 140 define a plurality of inter-element openings 170 between neighboring ones of the comb elements, each inter-element opening having a front-facing open end 175 at least partially defined by the forward portions of the second surfaces of the neighboring comb elements.

The head portion 141 serves to arrange the user's hair entering from the front of the cutting edge 112 to the cutting edge 112. Thereby, the hair may contact the cutting edge 112 in the arranged state, thus making it easier to cut the hair.

The head portion 141 may have a shape that becomes narrower in width toward the free end of the head portion 141. For example, the width of the fixed end of the head portion 141 may have a value ranging from about 1.4 mm to 1.8 mm, while the width of the free end of the head portion 141 may have a value ranging from about 0.57 mm to 0.77 mm. However, the present disclosure is not limited thereto.

Since the head portion 141 has the shape that becomes narrower in width toward the free end, a distance between neighboring head portions 141 may be increased toward the free end of the head portion 141. For example, a distance between the fixed ends of the neighboring head portions 141 may have a value ranging from about 2.7 mm to 3.1 mm, while a distance between the free ends of the neighboring head portions 141 may have a value ranging from about 3.5 mm to 4.1 mm. However, the present disclosure is not limited thereto.

On the other hand, the plurality of comb elements 140 may extend toward the front of the receiving base 120 in the second direction d2 that is not perpendicular to the first direction d1. In this case, the second direction d2 may be substantially parallel to the shaving direction SD.

The razor cartridge 10 according to an embodiment of the present disclosure is configured such that the first direction d1 and the second direction d2 are not perpendicular to each other, thus making the hair be diagonally cut. This will be described in detail with reference to FIGS. 9A, 9B, 10A and 10B.

Turning back to FIGS. 1 and 2, each of the comb elements 140 may include a bottom surface (or a first surface) 142 and a top surface (or a skin facing portion of a second surface) 144.

The bottom surface 142 is a surface of the comb element 140 adjacent to the receiving base 120, and at least a portion of the bottom surface 142 may be adjacent to the cutting edge 112. The top surface 144 may face the bottom surface 142, and may be spaced apart from the cutting edge 112.

The top surface 144 may define a shaving plane SP (see FIG. 7) by contacting a user's skin. Thus, the hair may be cut by the cutting edge 112 at a position spaced apart from the shaving plane. That is, the stubble shaving may be made.

The plurality of comb elements 140 may be formed integrally with the cap 130. In this case, the plurality of comb elements 140 may extend from a side of the cap 130, and may have a continuous shape as a whole. However, the present disclosure is not limited thereto.

For example, the plurality of comb elements 140 may be formed on the receiving base 120 or in both the receiving base 120 and the cap 130. This will be described in detail with reference to FIGS. 12 and 13.

The receiving base 120 may further include a plurality of teeth 124.

The plurality of teeth 124 may be disposed to correspond in position to the plurality of comb elements 140, and may extend in the second direction d2.

The free ends of the plurality of teeth 124 may contact the head portions 141 of the plurality of comb elements 140.

Figure 7:
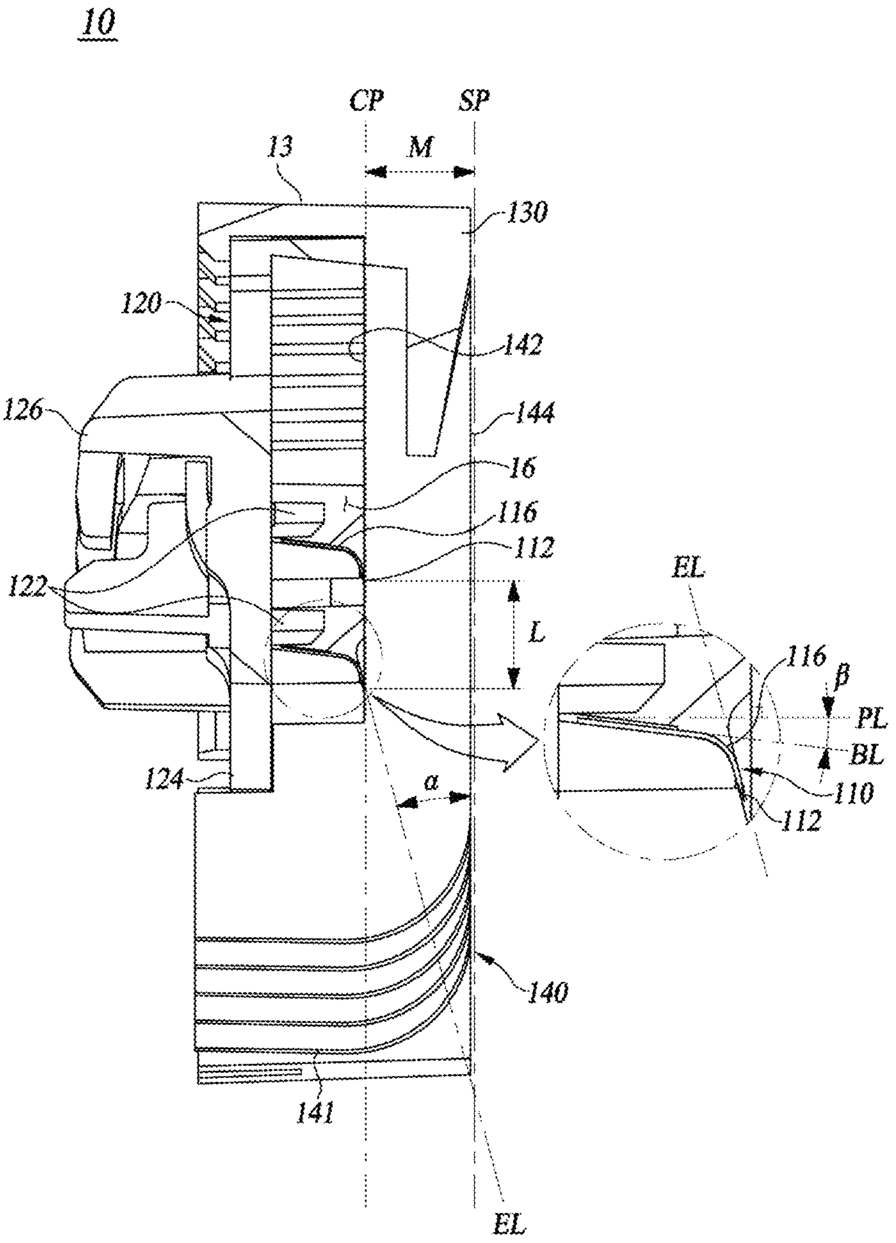
FIG. 7 is a sectional view taken along a direction VII-VII' of FIG. 3 to show the razor cartridge according to an embodiment of the present disclosure.

In this case, at least a portion of the bottom surface (or the first surface) 142 adjacent to the cutting edge 112, the forward portions of the second surfaces 141, and third surfaces (or a rear side 13), and an area (e.g., a cap-facing surface) of the receiving base 120 facing at least a portion of the bottom surface 142 may define a plurality of receiving holes 16 (see FIG. 2 and FIG. 7). The cap-facing surface may be configured to receive the base portion of the at least one shaving blade. The first surface 142 may include a recessed portion 135 (see FIG. 1) extending vertically toward the skin facing portion. The recessed portions 135 may define a second portion of the at least one receiving hole opposing the first portion and shaped to accommodate at least the edge portion of the at least one shaving blade. The at least one shaving blade may be taller than the receiving protrusions 122 such that each protrusion pair faces the base portion of the at least one shaving blade.

At least one shaving blade 110 may pass through the plurality of receiving holes 16. The plurality of receiving holes 16 may provide a sufficient space for the plurality of shaving blades 110 to be accommodated.

On the other hand, in order to form the receiving hole 16, at least a portion of the bottom surface 142 may at least partially surround the peripheral area of the shaving blade 110. To this end, the bottom surface 142 may have a stepped shape.

Figure 3:
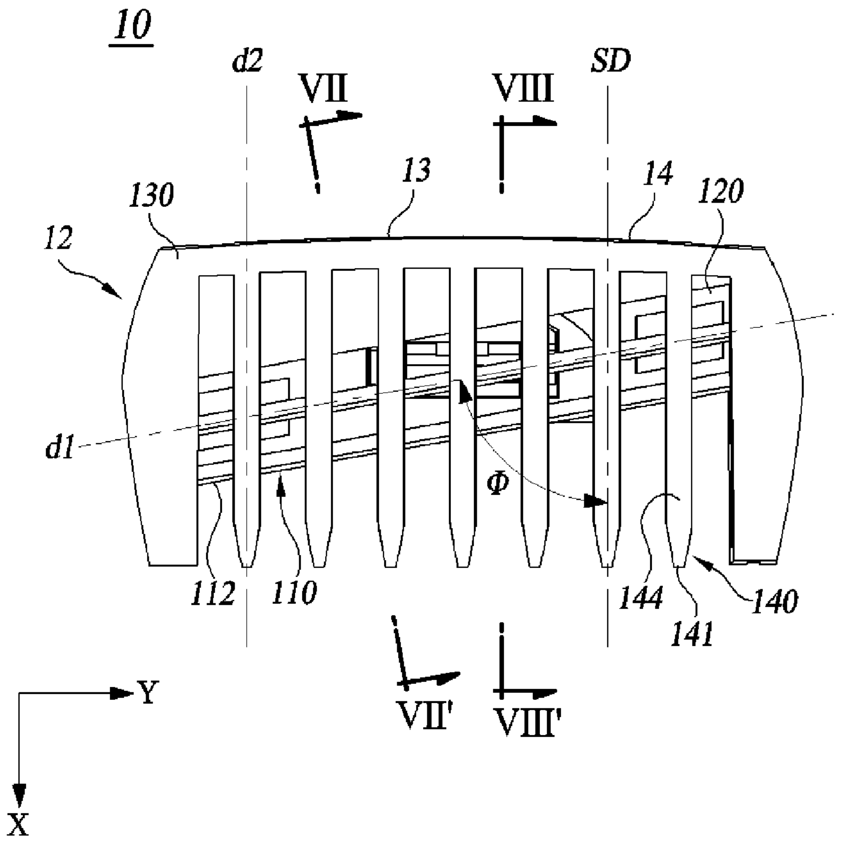
FIG. 3 is a front view illustrating the razor cartridge according to an embodiment of the present disclosure.

FIG. 3 is a front view illustrating the razor cartridge 10 according to an embodiment of the present disclosure.

Figure 4:
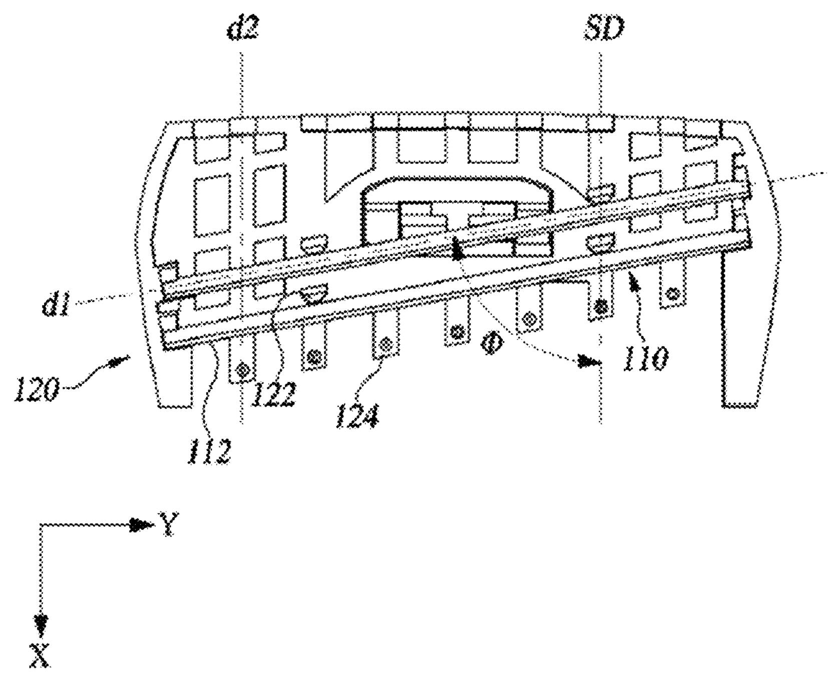
FIG. 4 illustrates a state in which a cap and a plurality of comb elements are removed from the razor cartridge of FIG. 3.

FIG. 4 illustrates a state in which the cap 130 and the plurality of comb elements 140 are removed from the razor cartridge 10 of FIG. 3. The cap 130 includes a third surface 13 and a plurality of comb elements 140, each defining a longitudinal axis, that collectively define a second direction that is non-orthogonal to the first direction.

Referring to FIGS. 3 and 4, the first direction d1 that is the arrangement direction of the shaving blade 110 may not be perpendicular to the shaving direction SD.

To be more specific, an angle Φ between the first direction d1 and the shaving direction SD may range from 70 degrees to 89 degrees.

Through the diagonal arrangement of the shaving blade 110, the hair may be effectively cut. This will be described in detail with reference to FIGS. 9A, 9B, 10A and 10B.

On the other hand, at least one shaving blade 110 may include the plurality of shaving blades 110 that are arranged side by side. Thus, the shaving blade cartridge 10 may provide multi-blade stubble shaving.

The plurality of comb elements 140 may be integrally formed.

To be more specific, each comb element 140 may be integrally formed from a side of the cap 130 from which each comb element 140 extends to the free end of the comb element 140. In this case, the top surfaces 144 of the comb elements 140 may have a continuous shape as a whole.

To be more specific, the top surface 144 of each comb element 140 extends toward the front of the receiving base 120 while completely traversing over each cutting edge 112. Therefore, when seeing the razor cartridge 10 with the top surface 144 facing toward the front, the plurality of comb elements 140 may at least partially cover a space between the plurality of shaving blades 110.

Therefore, it is possible to prevent a user's skin from being excessively pressed by a space between the plurality of shaving blades 110, thus restricting a direct contact between the cutting edge 112 of the shaving blade 110 and the user's skin. Thereby, the safety risk of cutting the pressed skin by the shaving blade 110 can be minimized.

On the other hand, in the front of the foremost shaving blade 110 among at least one shaving blade 110, the space between the plurality of comb elements 140 may not overlap the receiving base 120.

Therefore, the space between the comb elements 140 may be opened in front of the foremost shaving blade 110. Here, the foremost shaving blade 110 refers to a shaving blade disposed on the foremost position among at least one shaving blade 110.

Thereby, the user's hair may contact the foremost shaving blade 110 in an erected state without being interfered by the comb element 140 and the receiving base 120, thus allowing the hair to be effectively cut. This will be described in detail with reference to FIGS. 11A and 11B.

Figure 5:
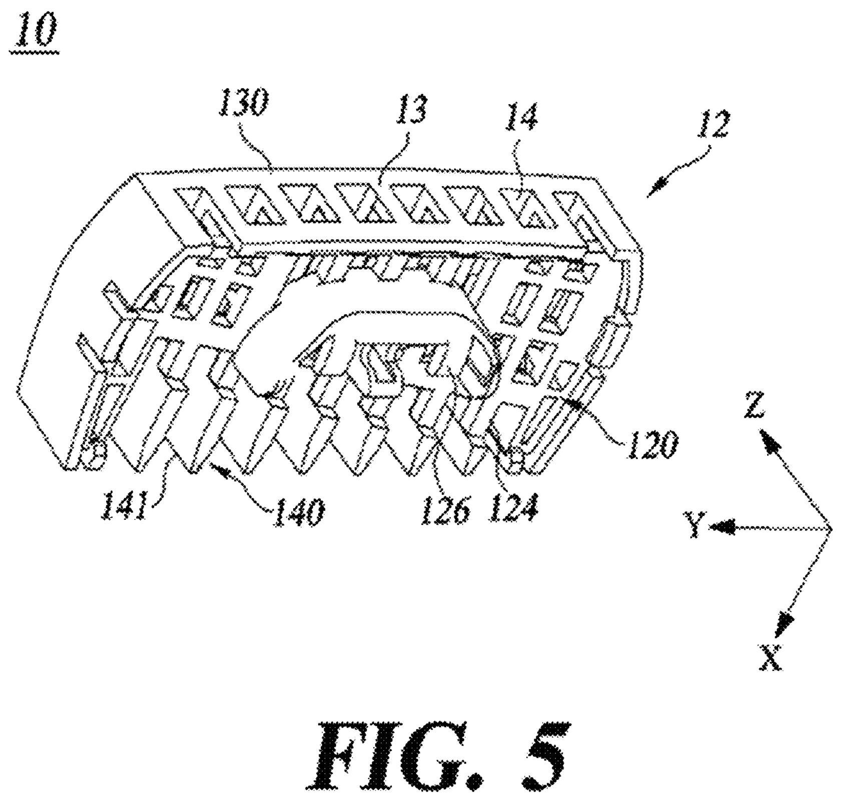
FIG. 5 is a rear perspective view illustrating the razor cartridge according to an embodiment of the present disclosure.

FIG. 5 is a rear perspective view illustrating the razor cartridge 10 according to an embodiment of the present disclosure.

Referring to FIG. 5, the blade housing 12 may include the rear side (or third surface) 13, a washing hole 14, and a handle connecting unit 126. The first surfaces 142 may be coupled to both of the forward portions of second surfaces 141 and the third surfaces 13 as shown in FIG. 2 and FIG. 5. Each of the forward portions includes a fourth surface 145 facing the same direction as the first surfaces, and widths 155 of the fourth surfaces are different from each other. The widths 155 of the fourth surfaces 145 increase in a direction perpendicular to the second direction.

The rear side 13 may be a side of the blade housing 12 that is positioned in back of at least one shaving blade 110.

At least one washing hole 14 may be formed in the rear side (or the third surfaces) 13, and may pass through the rear side 13. Further, at least one washing hole 14 may be disposed to correspond to a space between the comb elements 140.

The debris of the hair that is cut by the shaving blade 110 may be washed away from the razor cartridge 10 through the washing hole 14 formed in the rear side 13.

The handle connecting unit 126 may be disposed on the other side of the receiving base 120.

The handle connecting unit 126 may be configured to be coupled to a razor handle (not shown). To be more specific, the handle connecting unit 126 may be pivotably coupled to the razor handle, but the present disclosure is not limited thereto.

Figure 6A:
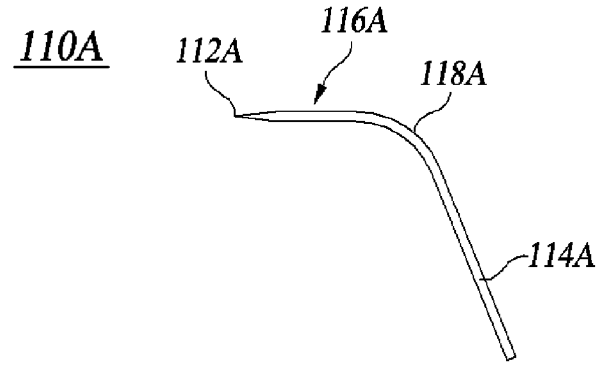
FIGS. 6A and 6B are side views illustrating a shaving blade according to an embodiment of the present disclosure.
Figure 6B:
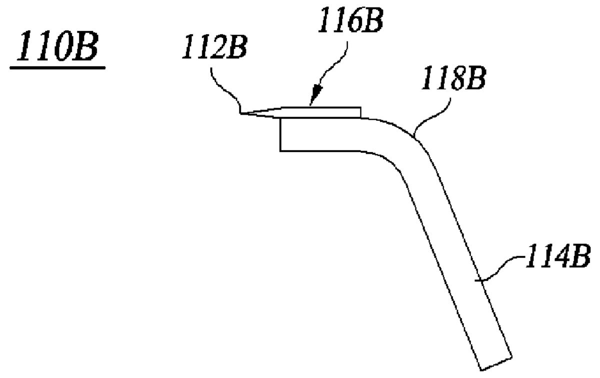

FIGS. 6A and 6B are side views illustrating the shaving blade 110 according to an embodiment of the present disclosure.

To be more specific, FIG. 6A shows the bending blade, and FIG. 6B shows the welded blade.

Referring to FIGS. 6A and 6B, the shaving blade 110 according to an embodiment of the present disclosure may include the bending blade or the welded blade having the bent area.

To be more specific, at least one shaving blade 110 may include a base portion 114 accommodated in the receiving base 120, and an edge portion 116 including the cutting edge 112.

The base portion 114 may be an area on the shaving blade 110 that is supported by the receiving protrusion 122 of the receiving base 120.

The edge portion 116 may extend from an end of the base portion 114, and may have the cutting edge 112 on an end of the edge portion 116.

Referring to FIG. 6A, in the bending blade 110A, the base portion 114A and the edge portion 116A may be integrally formed. In contrast, referring to FIG. 6B, in the welded blade 110B, the edge portion 116B may be fixed to a surface of the base portion 114B by welding.

The base portions 114A and 114B of the bending blade 110A and the welded blade 110B may include the bent areas 118A and 118B, respectively.

Since the razor cartridge 10 according to an embodiment of the present disclosure has the shaving blade of the bending blade or the welded blade, the spacer for spacing the cutting edge from the base member is not required.

Since no spacer is included, the razor cartridge 10 may have a simpler structure, and the entire size of the razor cartridge 10 may also be reduced.

FIG. 7 is a sectional view taken along a direction VII-VII' of FIG. 3 to show the razor cartridge 10 according to an embodiment of the present disclosure. Here, the direction VII-VII' of FIG. 3 is a direction that is perpendicular to the first direction d1.

Figure 8:
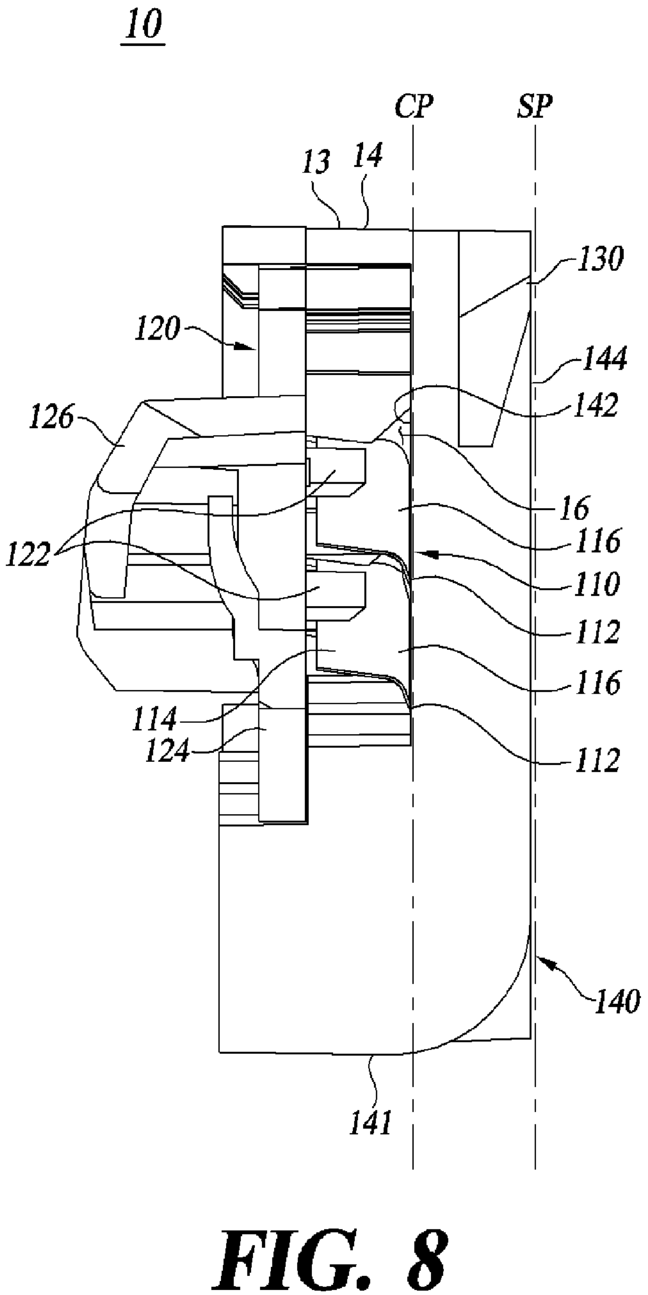
FIG. 8 is a sectional view taken along a direction VIII-VIII' of FIG. 3 to show the razor cartridge according to an embodiment of the present disclosure.

FIG. 8 is a sectional view taken along a direction VIII-VIII' of FIG. 3 to show the razor cartridge 10 according to an embodiment of the present disclosure. Here, the direction VIII-VIII' of FIG. 3 is a direction that is parallel to the second direction d2.

Referring to FIGS. 7 and 8, the cutting edge 112 of the shaving blade 110 may be received on the receiving base 120 to have a predetermined angle with the shaving plane SP.

To be more specific, referring to FIG. 7, an angle $\alpha$ between the extension direction EL of the cutting edge 112 and the shaving plane SP may range from 10 degrees to 25 degrees, and preferably from 13 degrees to 19 degrees. The shaving blade 110 may have an optimum cutting force within such an angular range of the cutting edge 112.

The base portion 114 may be supported by the plurality of receiving protrusions 122. In this case, on a section taken along the direction perpendicular to the first direction d1, the extension direction BL of the base portion 114 may not be parallel to a normal line PL of the shaving plane SP. Further, the extension direction BL of the base portion 114 may not be perpendicular to the second direction d2 in which the plurality of comb elements 140 extend.

In other words, the shaving blade 110 may be received on the receiving base 120 while the base portion 114 is slightly inclined with respect to the shaving plane SP. In this case, an angle $\beta$ between the normal line PL of the shaving plane SP and the extension direction BL of the base portion 114 may range from 5 degrees to 10 degrees, and preferably 7 degrees to 8 degrees. However, the present disclosure is not limited thereto.

In the stubble shaving, the relatively long hair may be cut in a slightly laid-down position. Therefore, in the stubble shaving, an ideal angle between the extension direction EL of the cutting edge 112 and the shaving plane may be different from that of the general shaving.

On the other hand, if the shaving blade different from the shaving blade (not shown) used in the general razor is separately manufactured and used to achieve the angle of the cutting edge 112 suitable for the stubble shaving, additional cost may be incurred in the manufacture of the shaving blade.

Therefore, the shaving blade 110 used in the stubble razor may use the same shaving blade as the general razor so as to prevent the additional cost from incurring.

The base portion 114 is received while being inclined with respect to the normal line PL of the shaving plane SP. Thus, even if the shaving blade of the general razor is used, the razor cartridge 10 according to an embodiment of the present disclosure can achieve the angle of the cutting edge 112 suitable for the stubble shaving. In this case, the angle between the base portion 114 and the edge portion 116 may range from 100 degrees to 120 degrees, and preferably 105 degrees to 115 degrees, as in the shaving blade used in the general razor.

However, the razor cartridge 10 according to an embodiment of the present disclosure may use the shaving blade that is further bent compared to the shaving blade used in the general razor, so as to simplify the receiving structure of the shaving blade 110. In this case, the angle between the base portion 114 and the edge portion 116 may range from 90 degrees to 110 degrees, and preferably 95 degrees to 105 degrees.

The cutting edge 112 of each of the shaving blades 110 may have the same protrusion value with respect to the shaving plane SP.

The protrusion value of each cutting edge 112 is defined as a distance between each cutting edge 112 and the top surface 144. However, in the case of having the plurality of shaving blades 110, the protrusion value of the cutting edge 112 may be defined as a distance between the top surface 144 and a cutting edge plane CP that is an imaginary plane formed by the cutting edges 112 of the plurality of shaving blades 110.

The cutting edge 112 of each of the shaving blades 110 may have a negative protrusion value with respect to the shaving plane SP. At this time, the protrusion value of the cutting edge 112 may be differently set depending on the length of the hair that is to be left through the stubble shaving.

In this connection, various kinds of caps 130 having different distances between the cutting edge 112 and the top surface 144 may be provided. For instance, a 3 mm-cap 130 in which the distance between the cutting edge 112 and the top surface 144 is 3 mm, and a 5 mm-cap 130 in which the distance between the cutting edge 112 and the top surface 144 is 5 mm may be provided.

The cap 130 may be detachably attached to the receiving base 120 to be replaced with another one. In this case, a user may detach an existing cap 130 from the receiving base 120, and then attach the cap 130 corresponding to a desired hair length to the receiving base 120.

On the other hand, in order to make proper stubble shaving, it is necessary to space a user's skin and the cutting edge 112 by a predetermined distance during shaving. Therefore, the distance between the top surface 144 and the cutting edge plane CP may be 1.0 mm or more. In this case, the cutting edge 112 may have a negative protrusion value of −1.0 mm or less.

In the multi-blade razor, it is necessary to space one cutting edge and another cutting edge by a predetermined distance. Therefore, in the plurality of shaving blades 110, the distance L between one cutting edge 112 and another cutting edge 112 may be 1.0 mm or more.

On the other hand, the distance L between one cutting edge 112 and another cutting edge 112 may be designed to vary depending on a distance M between the top surface 144 and the cutting edge plane CP.

For example, in the plurality of shaving blades 110, the distance L between one cutting edge 112 and another cutting edge 112 may be greater than the distance M between the top surface 144 and the cutting edge plane CP.

As compared to the general shaving, the hair cut by the cutting edge in the stubble shaving has a relatively longer length. On the other hand, in some cases, the hair may be directed to a subsequent cutting edge in a laid-down position without being cut by the cutting edge. In this connection, it may take a relatively longer time for the hair to be laid down by the cutting edge and then be erected again.

If the distance L between one cutting edge 112 and another cutting edge 112 has a relatively smaller value than the distance M between the top surface 144 and the cutting edge plane CP, the hair that is laid down without being cut by the cutting edge 112 located at a front position may reach the cutting edge 112 located at a rear position before the hair being sufficiently erected. In this case, since the hair is cut in a laid-down position, it is difficult to properly cut the hair by the cutting edge 112 located at the rear position.

Since the razor cartridge 10 according to an embodiment of the present disclosure is configured such that the distance L between one cutting edge 112 and a neighboring cutting edge 112 is greater than the distance M between the top surface 144 and the cutting edge plane CP, it is possible to provide a sufficient time until the hair that is laid down without being cut by the cutting edge 112 located at the front position reaches the cutting edge 112 located at the rear position. Thus, the effective stubble shaving using the multi-blade is possible.

Figure 9A:
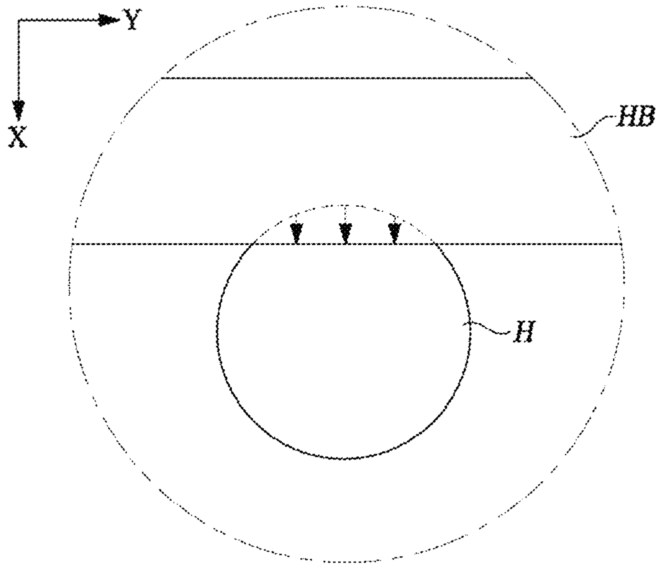
FIG. 9A (Prior Art)
FIGS. 9A and 9B are exemplary diagrams showing that hair is cut by a horizontal shaving blade that is disposed to be perpendicular to a shaving direction.
Figure 9B:
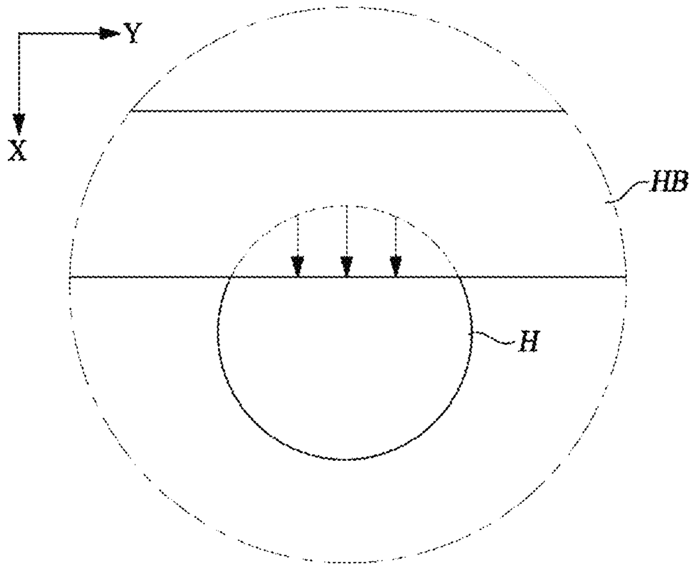
FIG. 9B (Prior Art)

FIGS. 9A and 9B are exemplary diagrams showing that hair H is cut by a horizontal shaving blade HB that is disposed to be perpendicular to the shaving direction.

Figure 10A:
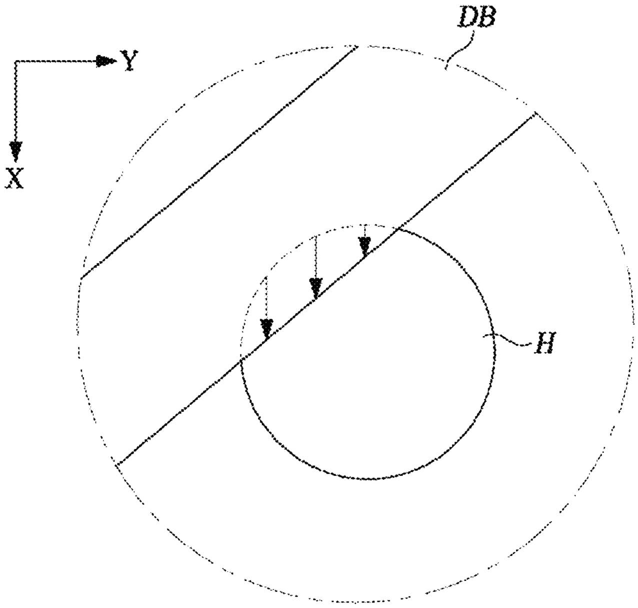
FIG. 10A (Prior Art)
FIGS. 10A and 10B are exemplary diagrams showing that hair is cut by a diagonal shaving blade that is disposed not to be perpendicular to the shaving direction.
Figure 10B:
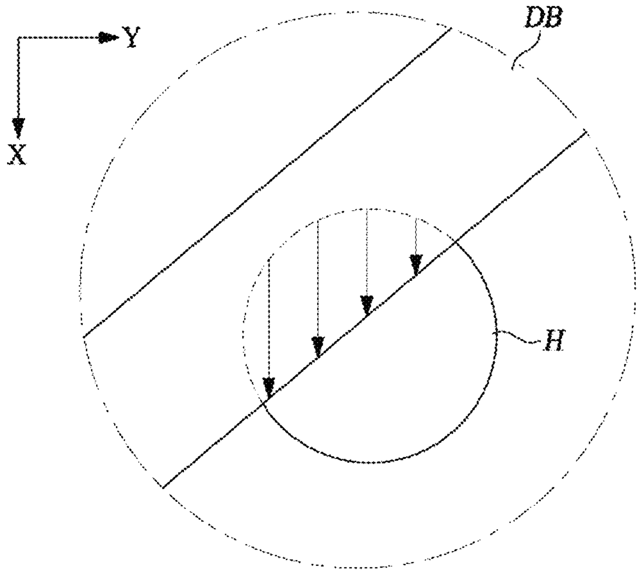
FIG. 10B (Prior Art)

FIGS. 10A and 10B are exemplary diagrams showing that the hair H is cut by a diagonal shaving blade DB that is disposed not to be perpendicular to the shaving direction.

To be more specific, FIG. 9A and FIG. 10A show states where the hair H starts to be cut by the horizontal shaving blade HB and the diagonal shaving blade DB, respectively, while FIG. 9B and FIG. 10B show states where half of the hair H is cut by the horizontal shaving blade HB and the diagonal shaving blade DB, respectively.

In FIGS. 9A, 9B, 10A and 10B, it is assumed that the horizontal shaving blade HB moves in a positive X-axis direction.

Further, in the description of FIGS. 9A, 9B, 10A and 10B, the upper area, the lower area, the left area, and the right area of the hair H are defined with reference to FIGS. 9A, 9B, 10A and 10B. For example, the upper area of the hair H refers to an area located in a negative X-axis direction on the hair H.

Since the razor cartridge 10 according to an embodiment of the present disclosure is used for the stubble shaving, it cuts a relatively long hair. Such a long hair has a weak erection force, so that the hair is easily laid down by the shaving blade.

Therefore, during the stubble shaving, there may occur a phenomenon in which the only a front portion of the hair is cut and a remaining rear portion is laid down by the shaving blade without being cut. In this case, the shaving blade may be operated with the hair embedded therein, and the hair may be pulled out without being cut. This may reduce cutting efficiency, and may give an unpleasant feeling to a user.

In this regard, the diagonal arrangement of the shaving blade 110 can minimize a problem where hair is pulled out. Hereinafter, a principle where the cutting force is reduced according to the diagonal arrangement of the shaving blade 110 will be described in detail.

Referring to FIGS. 9A and 9B, in a state where the hair H starts to be cut by the horizontal shaving blade HB, the upper area of the hair H may evenly contact the horizontal shaving blade HB.

Therefore, the cutting force by the horizontal shaving blade HB may be evenly transmitted to the upper area of the hair H, and the hair H may be cut by the cutting force of the horizontal shaving blade HB while the cutting force being dispersed in the upper area of the hair H. That is, the cutting degree in each area of the hair H may be small.

On the other hand, the cutting of the hair H may be accelerated as more cuts are made in the area of the hair H where the cutting is made. That is, as more cuts are made in the area of the hair H that is to be cut, the magnitude of the cutting force required to cut the hair H to the same degree may be reduced.

In this regard, when the hair H is cut from the state of FIG. 9A to the state of FIG. 9B using the horizontal shaving blade HB, a relatively large cutting force may be required.

In contrast, referring to FIG. 10A and FIG. 10B, in a state where the hair H starts to be cut by the diagonal shaving blade DB, the left area in the upper area of the hair H may preferentially contact the diagonal shaving blade DB.

Therefore, the cutting force by the diagonal shaving blade DB may be intensively transmitted to the left area of the upper area of the hair H, and the cutting of the hair H by the cutting force of the diagonal shaving blade DB may be intensively made in the left area of the upper area of the hair H.

As described above, the cutting of the hair H may be accelerated as more cuts are made in the area of the hair H where the cutting is made. In this regard, when the hair H is cut from the state of FIG. 10A to the state of FIG. 10B using the diagonal shaving blade DB, a relatively small cutting force may be required.

To be more specific, the cutting force of the diagonal shaving blade DB may concentrate on the left area in the upper area of the hair H, so a relatively large cut may be made. A cut in the left area of the hair H may aid in cutting the right area of the hair H that subsequently contacts the diagonal shaving blade DB.

Therefore, the razor cartridge 10 according to an embodiment of the present disclosure may provide more effective stubble shaving by diagonally arranging the shaving blade 110.

Figure 11A:
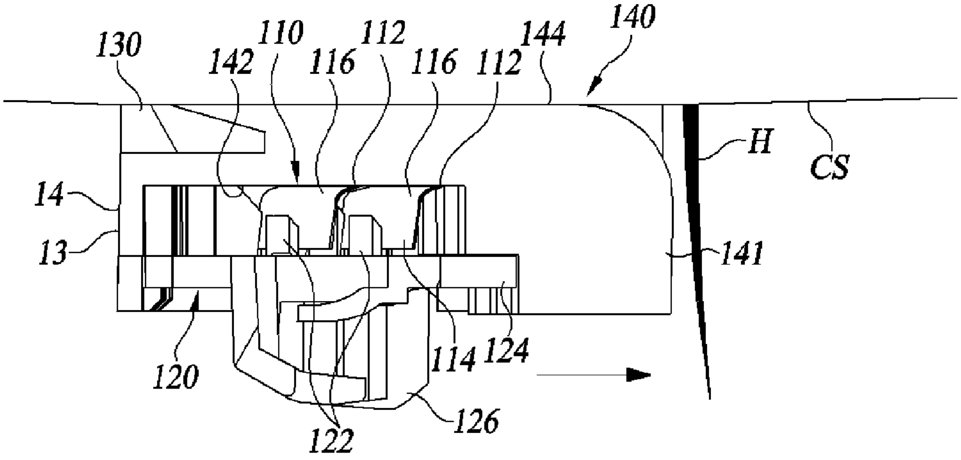
FIGS. 11A and 11B are exemplary diagrams showing that hair is cut by a shaving blade according to an embodiment of the present disclosure.
Figure 11B:
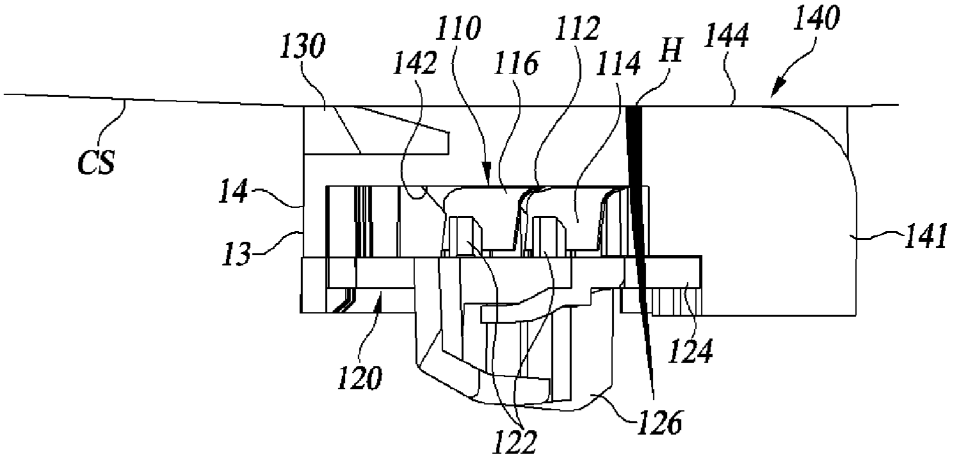

FIGS. 11A and 11B are exemplary diagrams showing that hair H is cut by the shaving blade 110 according to an embodiment of the present disclosure.

To be more specific, FIG. 11A shows a state before the hair H is introduced into the razor cartridge 10, and FIG. 11B shows a state in which the hair H is introduced into the razor cartridge 10 and enters the shaving blade 110.

For the convenience of description, FIG. 11A and FIG. 11B show the razor cartridge 10 and the hair H through the same cross-section as in FIG. 8.

Referring to FIG. 11A, the hair H may be arranged by the plurality of comb elements 140 while being introduced into the razor cartridge 10.

To be more specific, the hair H may be introduced into a space between the plurality of comb elements 140, and may be arranged in the second direction d2 that is the extension direction of the plurality of comb elements 140.

Since the hair H does not contact the razor cartridge 10 before being introduced into the razor cartridge 10, the erected state may be maintained.

Referring to FIG. 11B, the hair H arranged by the plurality of comb elements 140 may enter the shaving blade 110 while maintaining the erected state.

As shown in FIGS. 3 and 4, in front of the foremost shaving blade 110 among at least one shaving blade 110, the space between the plurality of comb elements 140 may not overlap the receiving base 120.

Therefore, the space between the comb elements 140 may be opened in front of the foremost shaving blade 110, and the hair H may contact the foremost shaving blade 110 in the erected state.

When the hair H contacts the shaving blade 110 in the erected state rather than the laid-down state, the hair may be more easily cut. Therefore, the razor cartridge 10 according to an embodiment of the present disclosure may provide more effective stubble shaving.

A second embodiment of the present disclosure shown in FIGS. 12 and 13, which will be described later, is different from the embodiment of the present disclosure shown in FIGS. 1 to 11 in that the plurality of comb elements are separately formed in the receiving base and the cap. Hereinafter, unique characteristics according to the second embodiment of the present disclosure will be mainly described, and a duplicated description of components which are substantially equal to those of the embodiment of the present disclosure will be omitted.

Figure 12:
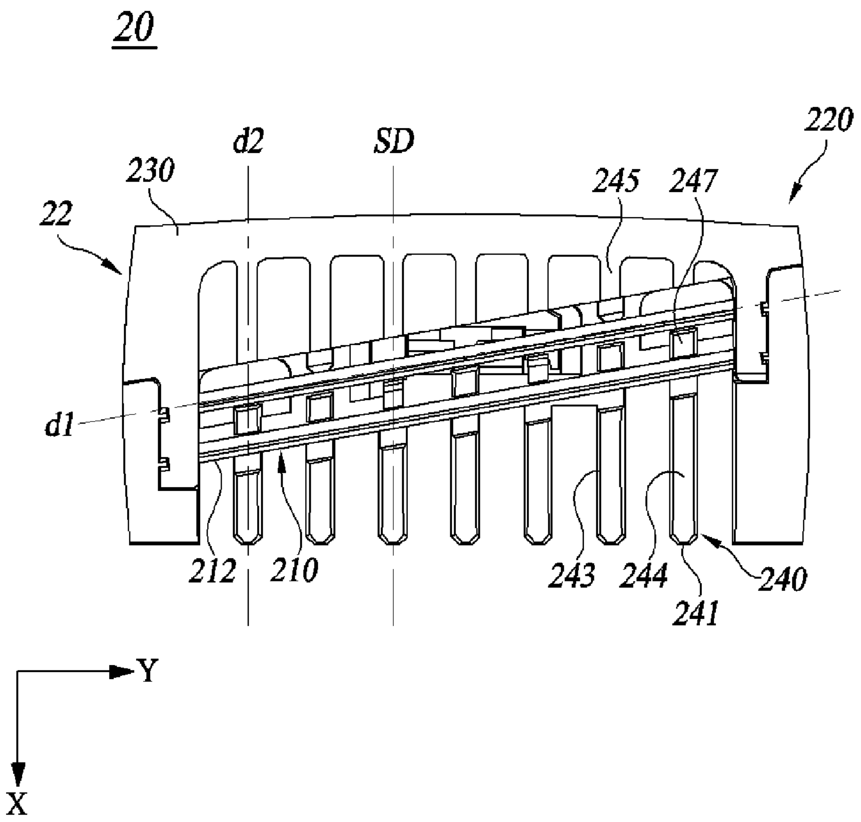
FIG. 12 is a front view illustrating a razor cartridge according to a second embodiment of the present disclosure.
Figure 13:
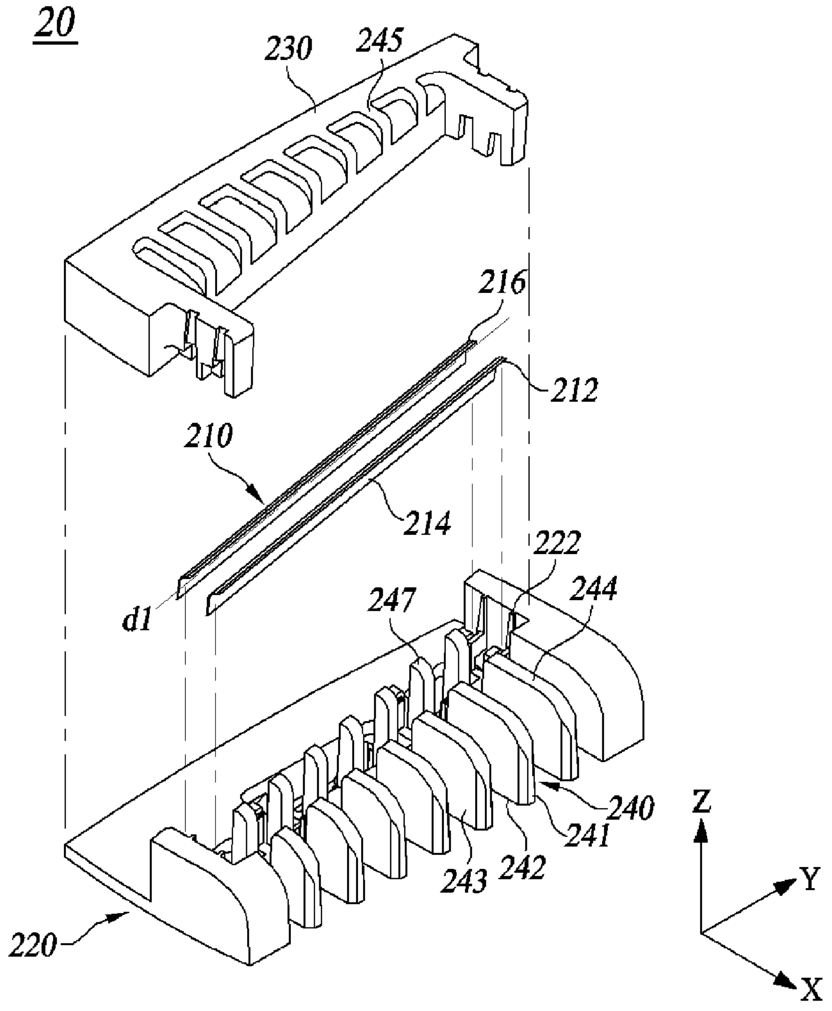
FIG. 13 is an exploded perspective view illustrating the razor cartridge according to the second embodiment of the present disclosure.

Referring to FIGS. 12 and 13, a razor cartridge 20 may include a blade housing 22 and at least one shaving blade 210.

The blade housing 22 may include a receiving base 220, a cap 230, and a plurality of comb elements 240.

At least one shaving blade 210 may be accommodated in the blade housing 22 while being arranged in a first direction d1. In this case, the first direction d1 may not be perpendicular to a shaving direction SD.

At least one shaving blade 210 may include a bending blade or a welded blade.

The receiving base 220 may receive at least one shaving blade 210 arranged in the first direction d1.

The cap 230 may cover at least a portion of the receiving base 220 in a state where the receiving base 220 receives at least one shaving blade 210.

The cap 230 may support both ends of at least one shaving blade 210, or may be fixed to cover the area of the receiving base 220 located in back of at least one shaving blade 210 while supporting both ends of at least one shaving blade 210. Thereby, at least one shaving blade 210 may be firmly maintained in the blade housing 22.

The plurality of comb elements 240 may extend toward the front of the receiving base 220, and at least some of the plurality of comb elements 240 may be disposed in front of at least one shaving blade 210.

The plurality of comb elements 240 may arrange a user's hair using a space between the comb elements 240 during shaving. The plurality of comb elements 240 may include head portions 241 formed on free ends of the plurality of comb elements 240.

The head portion 241 may have a tapered shape that becomes narrower in width toward the free end of the head portion 241. For example, the width of the fixed end of the head portion 241 may have a value ranging from about 1.4 mm to 1.8 mm, while the width of the free end of the head portion 241 may have a value ranging from about 0.57 mm to 0.77 mm. However, the present disclosure is not limited thereto.

Since the head portion 241 has the shape that becomes narrower in width toward the free end, a distance between neighboring head portions 241 may be increased toward the free end of the head portion 241. For example, a distance between the fixed ends of the neighboring head portions 241 may have a value ranging from about 2.7 mm to 3.1 mm, while a distance between the free ends of the neighboring head portions 241 may have a value ranging from about 3.5 mm to 4.1 mm. However, the present disclosure is not limited thereto.

On the other hand, the plurality of comb elements 240 may extend toward the front of the receiving base 220 in the second direction d2 that is not perpendicular to the first direction d1. In this case, the second direction d2 may be substantially parallel to the shaving direction SD.

The plurality of comb elements 240 each may include a top surface 244. The top surfaced 244 of the comb element 240 may be spaced apart from a cutting edge 212.

The top surface 244 of the comb element 240 may define a shaving plane by contacting a user's skin. Thus, the hair may be cut by the cutting edge 212 at a position spaced apart from the shaving plane.

The plurality of comb elements 240 according to the second embodiment of the present disclosure may include a plurality of front combs 243, a plurality of middle combs 247, and a plurality of rear combs 245. In this case, the top surfaces 244 of the plurality of comb elements 240 may include first top surfaces formed on the plurality of front combs 243, second top surfaces formed on the plurality of middle combs 247, and third top surfaces formed on the plurality of rear combs 245. The shaving plane may be defined by the first top surface, the second top surface, and the third top surface.

The cutting edge 212 of each of the shaving blades 210 may have the same protrusion value with respect to the shaving plane. For example, the protrusion value of the cutting edge 212 may be −1.0 mm, but the present disclosure is not limited thereto.

On the other hand, each of the plurality of front combs 243, the plurality of middle combs 247, and the plurality of rear combs 245 may protrude 3.6 mm or more from a surface of the receiving base 220. In this case, the protrusion value of the cutting edge 212 of the shaving blade 210 may be −1.0 mm. Although the protrusion heights of the plurality of front combs 243, the plurality of middle combs 247, and the plurality of rear combs 245 may be equal to each other, the present disclosure is not limited thereto.

The plurality of front combs 243 may be formed on the receiving base 220 in front of at least one shaving blade 210, and may extend in a second direction d2.

The plurality of front combs 243 may be areas disposed at front positions on the plurality of comb elements 240, and each may include at least a portion of the top surface 244.

The plurality of middle combs 247 may be formed on the receiving base 220 between the plurality of shaving blades 210. Thereby, it is possible to prevent a user's skin from being excessively pressed by a space between the plurality of shaving blades 210. Thereby, the safety risk of cutting the pressed skin by the shaving blade 210 can be minimized.

The plurality of middle combs 247 may be areas disposed at middle positions on the plurality of comb elements 240, and may be disposed to correspond in position to the plurality of front combs 243.

The plurality of front combs 243 and the plurality of middle combs 247 may be formed by injection on the receiving base 220. In this case, the plurality of front combs 243 and the plurality of middle combs 247 may be formed integrally with the receiving base 220.

The plurality of rear combs 245 may be formed on the cap 230 in back of at least one shaving blade 210, and may extend in the second direction d2.

The plurality of rear combs 245 may be areas disposed at rear positions on the plurality of comb elements 240, and the plurality of rear combs 245 may be disposed to correspond in position to the plurality of front combs 243.

Since the plurality of front combs 243 are formed on the receiving base 220, the space between the comb elements 240 may be opened in front of the foremost shaving blade 210.

To be more specific, the plurality of front combs 243 may be formed on the receiving base 220 such that the space between the comb elements 240 is opened in front of the foremost shaving blade 210.

Thereby, the user's hair may contact the foremost shaving blade 210 in an erected state without being interfered by the comb element 240, thus allowing the hair to be effectively cut.

On the other hand, the plurality of middle combs 247 are required only when the razor cartridge 20 includes a plurality of shaving blades 210. Therefore, if the razor cartridge 20 includes only one shaving blade 210, the shaving plane may be defined only by the first top surface and the third top surface. In this case, the protrusion value of the cutting edge 212 may be −1.0 mm or less.

Although FIGS. 12 and 13 show that the plurality of comb elements 240 include the front combs 243, the middle combs 247, and the rear combs 245, the present disclosure is not limited thereto.

For example, the plurality of comb elements 240 may include only the front combs 243 without the rear comb 245, or may include only the front combs 243 and the middle combs 247.

When the plurality of comb elements 240 include only the front combs 243 without the rear comb 245, the shaving plane may be defined by the first top surface formed on the front comb 243 and the top surface of the cap 230 located in back of at least one shaving blade 210. In this case, the protrusion value of the cutting edge 212 may be −1.0 mm or less.

When the plurality of comb elements 240 include only the front combs 243 and the middle combs 247, the shaving plane may be defined by the first top surface formed on the front comb 243, the second top surface formed on the middle comb 247, and the top surface of the cap 230 located in back of at least one shaving blade 210. In this case, the protrusion value of the cutting edge 212 may be −1.0 mm or less.

A third embodiment of the present disclosure shown in FIGS. 14 to 19, which will be described later, is different from the embodiment of the present disclosure shown in FIGS. 1 to 11 in that the free ends of the plurality of comb elements are diagonally arranged. Hereinafter, unique characteristics according to the third embodiment of the present disclosure will be mainly described, and a duplicated description of components which are substantially equal to those of the embodiment of the present disclosure will be omitted.

Figure 14:
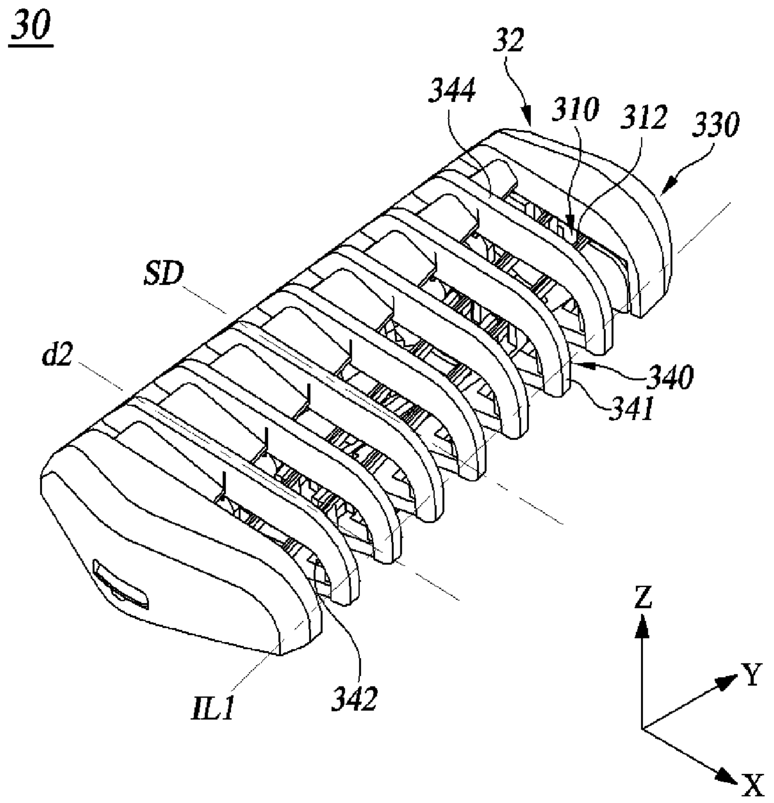
FIG. 14 is a perspective view illustrating a razor cartridge according to a third embodiment of the present disclosure.

FIG. 14 is a perspective view illustrating a razor cartridge 30 according to a third embodiment of the present disclosure.

Figure 15:
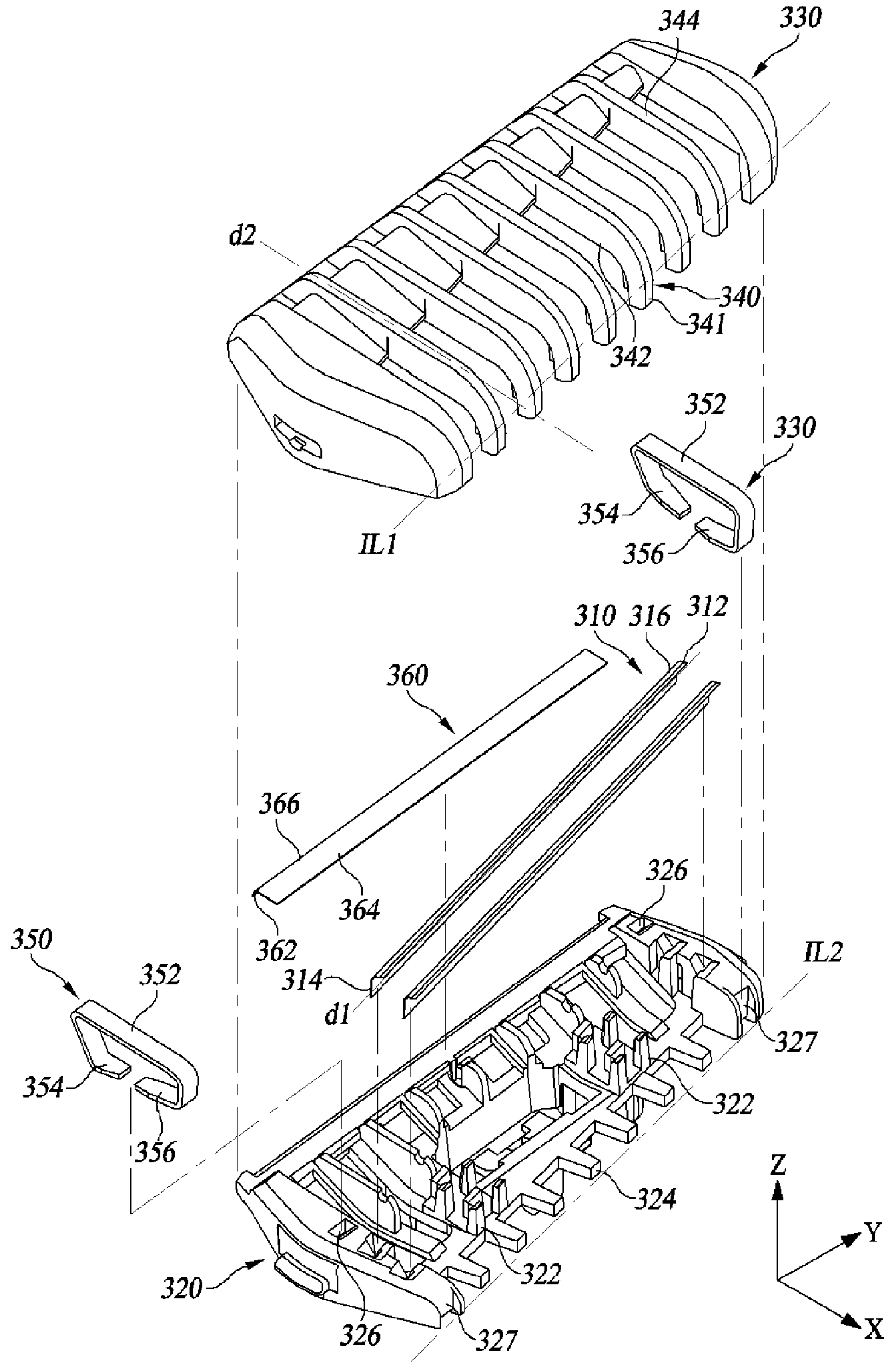
FIG. 15 is an exploded perspective view illustrating the razor cartridge according to the third embodiment of the present disclosure.

FIG. 15 is an exploded perspective view illustrating the razor cartridge 30 according to the third embodiment of the present disclosure.

Referring to FIGS. 14 and 15, a razor cartridge 30 may include a blade housing 32 and at least one shaving blade 310.

The blade housing 32 may include a receiving base 320, a cap 330, and a plurality of comb elements 340.

At least one shaving blade 310 may be accommodated in the blade housing 32 while being arranged in a first direction d1. In this case, the first direction d1 may not be perpendicular to a shaving direction SD. That is, at least one shaving blade 310 according to the third embodiment of the present disclosure may be diagonally arranged.

At least one shaving blade 310 may include a bending blade or a welded blade.

The receiving base 320 may receive at least one shaving blade 310 arranged in the first direction d1.

The receiving base 320 may include a plurality of receiving protrusions 322 for receiving at least one shaving blade 310. The plurality of receiving protrusions 322 may be arranged on a surface of the receiving base 320 adjacent to at least one shaving blade 310 in the first direction d1.

The plurality of receiving protrusions 322 may support the base portion 114 of at least one shaving blade 310.

To be more specific, the base portion 314 may be disposed between the receiving protrusion 322 disposed in front of the base portion 314 and the receiving protrusion 322 disposed in back of the base portion 314, and may be supported by each receiving protrusion 322.

The cap 330 may cover at least a portion of the receiving base 320 in a state where the receiving base 320 receives at least one shaving blade 310.

The plurality of comb elements 340 may extend toward the front of the receiving base 320, and at least some of the plurality of comb elements 340 may be disposed in front of at least one shaving blade 310.

The plurality of comb elements 340 may arrange a user's hair using a space between the comb elements 340 during shaving. The plurality of comb elements 340 may include head portions 341 formed on the free ends of the plurality of comb elements 340.

The razor cartridge 30 according to the third embodiment of the present disclosure has a technical feature that the free ends of the plurality of comb elements 340, for instance, the free ends of the head portions 341 are disposed on a first imaginary straight line IL1 that is not perpendicular to the shaving direction SD. That is, the free ends of the plurality of comb elements 340 according to the third embodiment of the present disclosure may be diagonally arranged. This will be described in detail with reference to FIG. 16.

On the other hand, the plurality of comb elements 340 may extend toward the front of the receiving base 320 in the second direction d2 that is not perpendicular to the first direction d1. In this case, the second direction d2 may be substantially parallel to the shaving direction SD.

Each of the comb elements 340 may include a bottom surface 342 and a top surface 344.

The bottom surface 342 is a surface of the comb element 340 adjacent to the receiving base 320, and at least a portion of the bottom surface 342 may be adjacent to the cutting edge 312. The top surface 344 may face the bottom surface 342, and may be spaced apart from the cutting edge 312.

The top surface 344 may define a shaving plane by contacting a user's skin. Thus, the hair may be cut by the cutting edge 312 at a position spaced apart from the shaving plane. That is, the stubble shaving may be made.

The plurality of comb elements 340 may be formed integrally with the cap 330. In this case, the plurality of comb elements 340 may extend from a side of the cap 330, and may have a continuous shape as a whole.

However, the present disclosure is not limited thereto. The comb element 340 according to the third embodiment of the present disclosure may be a combination of a front comb (not shown), a middle comb (not shown), and a rear comb (not shown), similarly to the second embodiment of the present disclosure.

The receiving base 320 may further include a plurality of teeth 324.

The plurality of teeth 324 may be disposed to correspond in position to the plurality of comb elements 340. To be more specific, the free ends of the plurality of teeth 324 may extend along a second imaginary straight line IL2 that is substantially parallel to the first imaginary straight line IL1.

The free ends of the plurality of teeth 324 may contact the head portions 341 of the plurality of comb elements 340.

Figure 19:
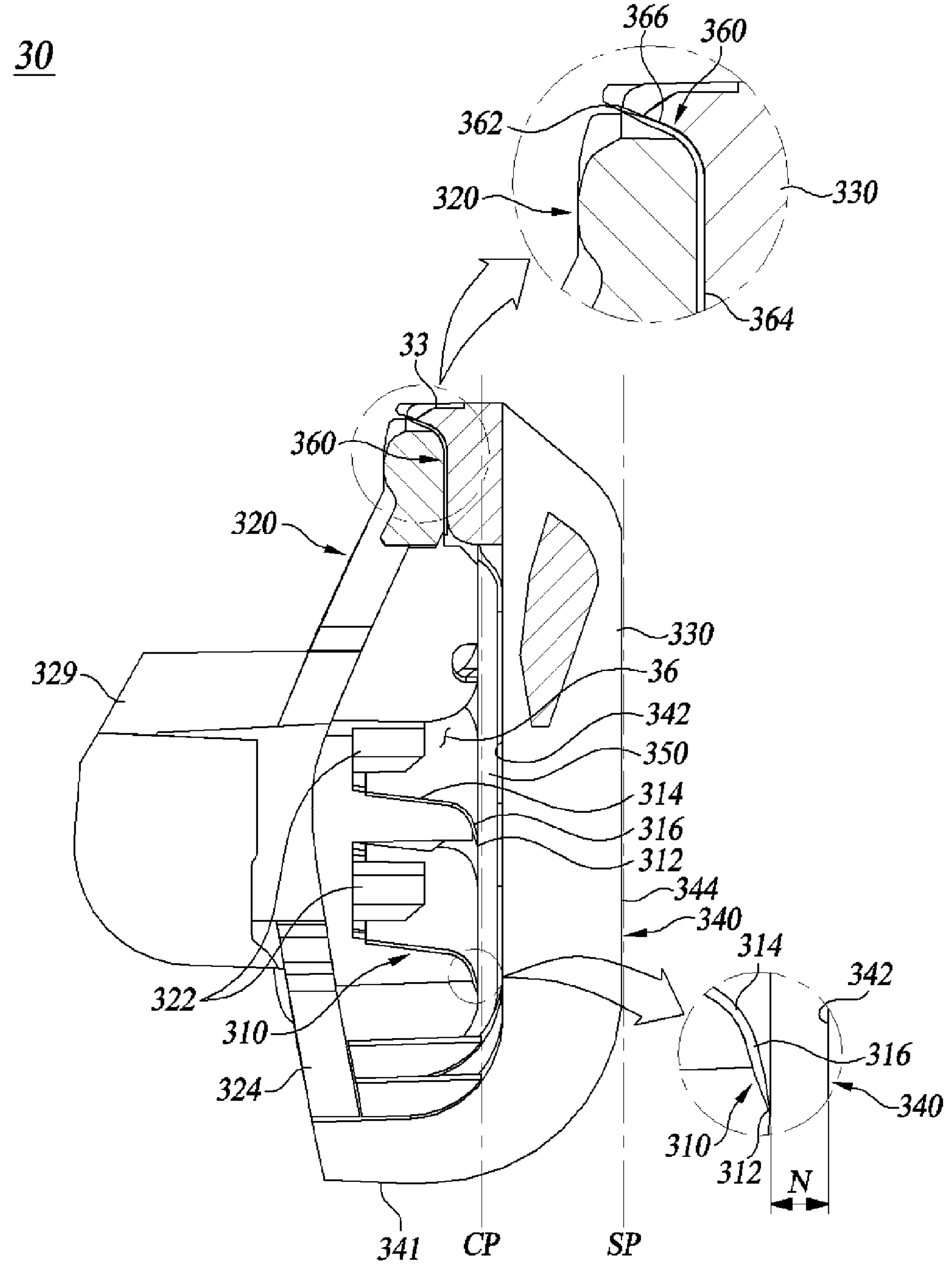
FIG. 19 is a sectional view taken along a direction XIX-XIX' of FIG. 16 to show the razor cartridge according to the third embodiment of the present disclosure.

In this case, at least a portion of the bottom surface 342 adjacent to the cutting edge 312 and an area of the receiving base 320 facing at least a portion of the bottom surface 342 may define a plurality of receiving holes 36 (see FIG. 19).

At least one shaving blade 310 may pass through the plurality of receiving holes 36. The plurality of receiving holes 36 may provide a sufficient space for the plurality of shaving blades 310 to be accommodated.

On the other hand, in order to form the receiving hole 36, at least a portion of the bottom surface 342 may at least partially surround the peripheral area of the shaving blade 310. To this end, the bottom surface 342 may have a stepped shape.

Referring to FIG. 15, the razor cartridge 30 according to the third embodiment of the present disclosure may further include a plurality of clips 350 and a trimming blade 360.

The plurality of clips 350 may support both ends of at least one shaving blade 310.

Each of the clips 350 may include a retaining portion 352, a first leg portion 354, and a second leg portion 356.

The retaining portion 352 may provide a retaining force to at least one shaving blade 310 by contacting both ends of at least one shaving blade 110.

The first leg portion 354 may extend from one end of the retaining portion 352, while the second leg portion 356 may extend from the other end of the retaining portion 352.

The first leg portion 354 and the second leg portion 356 may be inserted into through holes formed on the receiving base 320, or may be received in a mounting groove formed on the receiving base 320.

After the leg portions 354 and 356 are inserted into the through holes or received in the mounting groove, the free ends of the leg portions 354 and 356 may be bent to surround the bottom surface of the receiving base 320. Thereby, the clip 350 may be firmly fixed to the receiving base 320.

After the clip 350 is fixed to the receiving base 320, the cap 330 may be mounted on the receiving base 320, and thus the assembly of the razor cartridge 30 may be completed.

In the case of supporting the shaving blade 310 through the clips 350, it is unnecessary to make the cap 330 or the comb element 340 contact the cutting edge 312 for the purpose of supporting the shaving blade 310. That is, in the case of using the clip 350, the razor cartridge 30 may be designed such that a slight gap is formed between the cutting edge 312 and the cap 330 or between the cutting edge 312 and the comb element 340.

Through the formation of the gap, a ponding phenomenon that may occur in an area adjacent to the cutting edge 312 may be minimized, and thus the rust generation of the shaving blade 310 due to the ponding may be minimized.

Further, the clip 350 may electrically contact the shaving blade 310, and thus the rust generation of the shaving blade 310 may be minimized. To be more specific, the clip 350 may function as a sacrificial anode from which corrosion is made, and the shaving blade 310 may function as a cathode that is protected from corrosion.

Furthermore, in the case of supporting the shaving blade 310 through the clip 350, when the cap 330 is separated from the receiving base 320 for the replacement of the cap 330 or the like, it is possible to prevent a safety problem in which the shaving blade 310 is removed from the receiving base 320.

The trimming blade 360 may be disposed on the bottom surface or side surface of the blade housing 32 to be behind at least one shaving blade 310.

The trimming blade 360 may include a trimming edge 362. The trimming edge 362 may cut a user's hair during trimming shaving.

A direction in which the trimming edge 362 faces may be opposite to a direction in which the cutting edge 312 of the shaving blade 310 faces.

The trimming blade 360 may include a base portion 364 and an edge portion 356 extending from one end of the base portion 364, and the edge portion 356 may include the trimming edge 362.

Since the base portion 364 is supported by the receiving base 320 and the cap 330, the trimming blade 360 may be fixed to the blade housing 32. The fixing method of the trimming blade 360 will be described with reference to FIG. 19.

Figure 16:
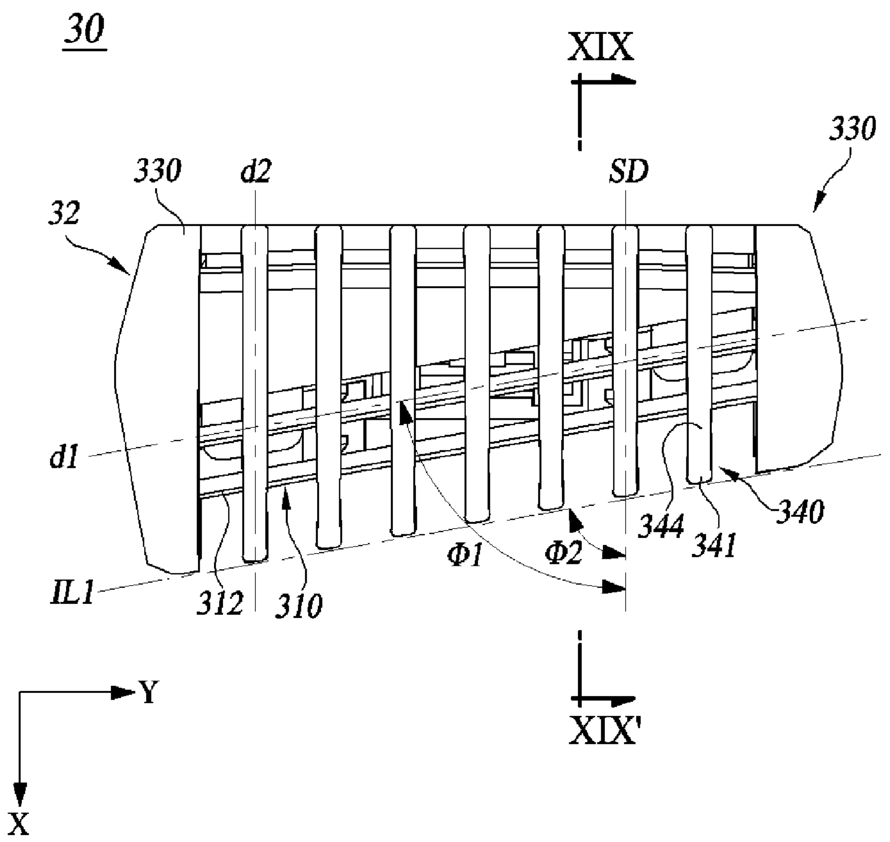
FIG. 16 is a front view illustrating the razor cartridge according to the third embodiment of the present disclosure.

FIG. 16 is a front view illustrating the razor cartridge 30 according to the third embodiment of the present disclosure.

Referring to FIG. 16, the first direction d1 that is the arrangement direction of the shaving blade 310 may not be perpendicular to the shaving direction SD.

To be more specific, a first angle Φ1 between the first direction d1 and the shaving direction SD may range from 70 degrees to 89 degrees. Through the diagonal arrangement of the shaving blade 310, the hair may be effectively cut.

On the other hand, at least one shaving blade 310 may include the plurality of shaving blades 310 that are arranged side by side. Thus, the shaving blade cartridge 30 may provide multi-blade stubble shaving.

The plurality of comb elements 340 may be integrally formed.

To be more specific, each comb element 340 may be integrally formed from a side of the cap 330 from which each comb element 340 extends to the free end of the comb element 340. In this case, the top surfaces 344 of the comb elements 340 may have a continuous shape as a whole.

To be more specific, the top surface 344 of each comb element 340 extends toward the front of the receiving base 320 while completely traversing over each cutting edge 312. Therefore, when seeing the razor cartridge 30 with the top surface 344 facing toward the front, the plurality of comb elements 340 may at least partially cover a space between the plurality of shaving blades 310.

Therefore, it is possible to prevent a user's skin from being excessively pressed by a space between the plurality of shaving blades 310, thus restricting a direct contact between the cutting edge 312 of the shaving blade 310 and the user's skin. Thereby, the safety risk of cutting the pressed skin by the shaving blade 310 can be minimized.

On the other hand, in the front of the foremost shaving blade 310 among at least one shaving blade 310, the space between the plurality of comb elements 340 may not overlap the receiving base 320.

Therefore, the space between the comb elements 340 may be opened in front of the foremost shaving blade 310. Here, the foremost shaving blade 310 refers to a shaving blade disposed on the foremost position among at least one shaving blade 310.

Thereby, the user's hair may contact the foremost shaving blade 310 in an erected state without being interfered by the comb element 340 and the receiving base 320, thus allowing the hair to be effectively cut.

The free ends of the plurality of comb elements 340, for instance, the free ends of the head portions 341 may be disposed on the first imaginary straight line IL1 that is not perpendicular to the shaving direction SD. That is, the free ends of the plurality of comb elements 340 according to the third embodiment of the present disclosure may be diagonally arranged.

Since both the shaving blade 310 and the free ends of the comb elements 340 are diagonally arranged, the cutting edge 312 of the shaving blade 310 and the free ends of the comb elements 340 may be disposed to be closer to each other. Thereby, shaving made in a rather narrow area, for example, mustache shaving or the like can be performed more smoothly.

In this connection, turning back to FIG. 3, when the shaving blade 110 is diagonally disposed and the free end of the comb element 140 is disposed to be perpendicular to the shaving direction SD, the distance between the shaving blade 110 and the free end of the comb element 140 may be increased in the area of the shaving blade 110 that is disposed at a relatively rear position, for instance, in the right area of the razor cartridge 10 of FIG. 3. Thus, shaving made in a rather narrow area, for example, mustache shaving or the like may not be performed smoothly.

In contrast, in the third embodiment of the present disclosure, since both the shaving blade 310 and the free end of the comb element 340 are diagonally disposed, the distance between the cutting edge 312 and the free end of the comb element 340 may become shorter for each comb element 340.

Since this may be relatively advantageous to access to the narrow shaving area and the distance between the hair and the cutting edge 312 becomes shorter, access of the hair to the cutting edge 312 may become easy.

The first imaginary straight line IL1 may be substantially parallel to the first direction d1. In this case, the distance between the cutting edge 312 and the free end of the comb element 340 may become uniform for each comb element 340. At this time, the distance between the cutting edge 312 and the free end of the comb element 340 may range from 2.0 mm to 6.0 mm, and preferably be 4.0 mm.

Since the distance between the cutting edge 312 and the free end of the comb element 340 becomes uniform, the accessibility of the hair to all areas of the cutting edge 312 may be improved.

On the other hand, when the first imaginary straight line IL1 is parallel to the first direction d1, the second angle Φ2 between the first imaginary straight line IL1 and the shaving direction SD may have the same value as the first angle Φ1 that is the angle between the first direction d1 and the shaving direction SD. Therefore, the second angle Φ2 may range from 70 degrees to 89 degrees, similarly to the first angle Φ1.

However, the present disclosure is not limited thereto, but the first imaginary straight line IL1 may not be parallel to the first direction d1. That is, the first imaginary straight line IL1 and a straight line parallel to the first direction d1 may form a predetermined angle.

If the first imaginary straight line IL1 and the straight line parallel to the first direction d1 intersect with each other on the left side of the razor cartridge 30 in FIG. 16, the distance between the cutting edge 312 and the free end of the comb element 340 may be gradually increased from left to right.

In contrast, if the first imaginary straight line IL1 and the straight line parallel to the first direction d1 intersect with each other on the right side of the razor cartridge 30 in FIG. 16, the distance between the cutting edge 312 and the free end of the comb element 340 may be gradually reduced from left to right.

On the other hand, although FIG. 16 illustrates that the free ends of the plurality of comb elements 340 are disposed on a single straight line, the present disclosure is not limited thereto. For example, a profile formed by the free ends of the plurality of comb elements 340 may include at least a portion of a curved area or a plurality of straight areas having different inclinations.

FIGS. 17A, 17B, 18A and 18B illustrate a state in which the cap 330 and the plurality of comb elements 340 are removed from the razor cartridge 30 of FIG. 16.

Figure 17A:
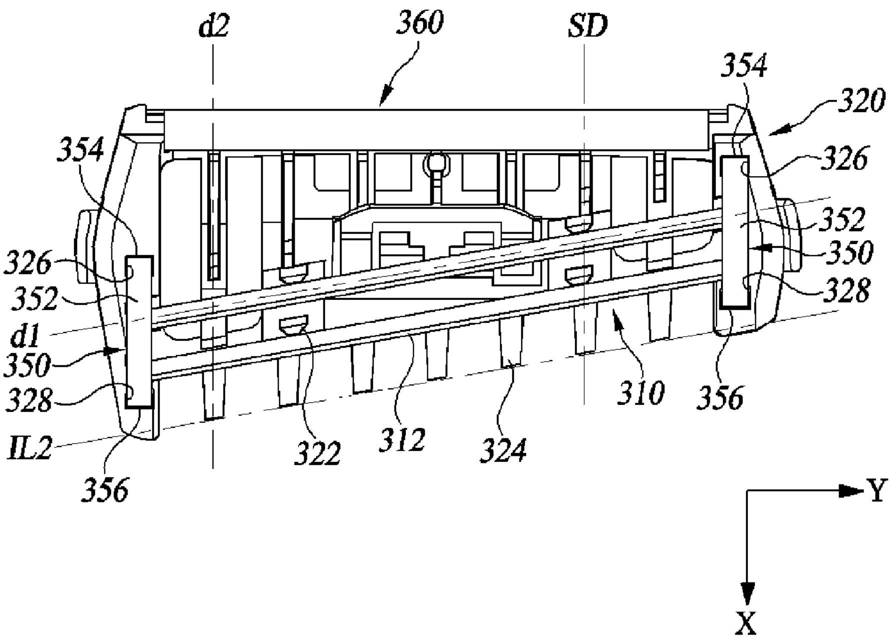
FIGS. 17A, 17B, 18A and 18B illustrate a state in which a cap and a plurality of comb elements are removed from the razor cartridge of FIG. 16.
Figure 17B:
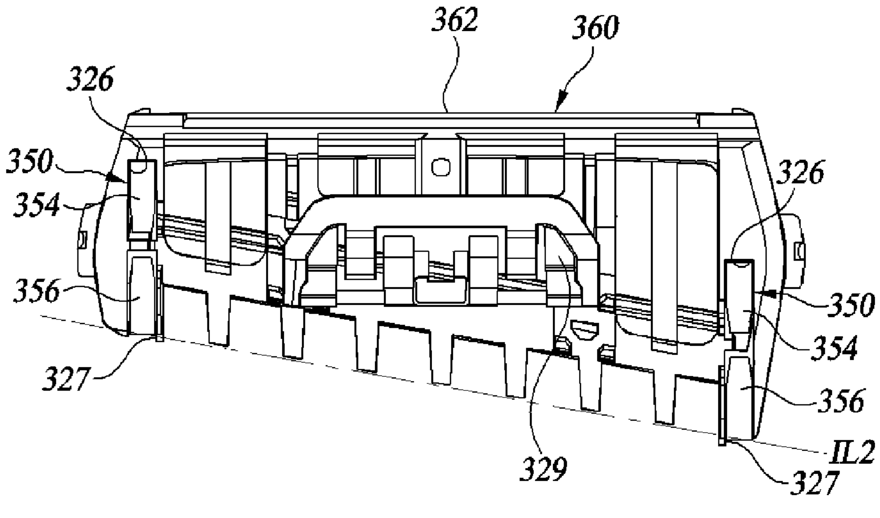
Figure 18A:
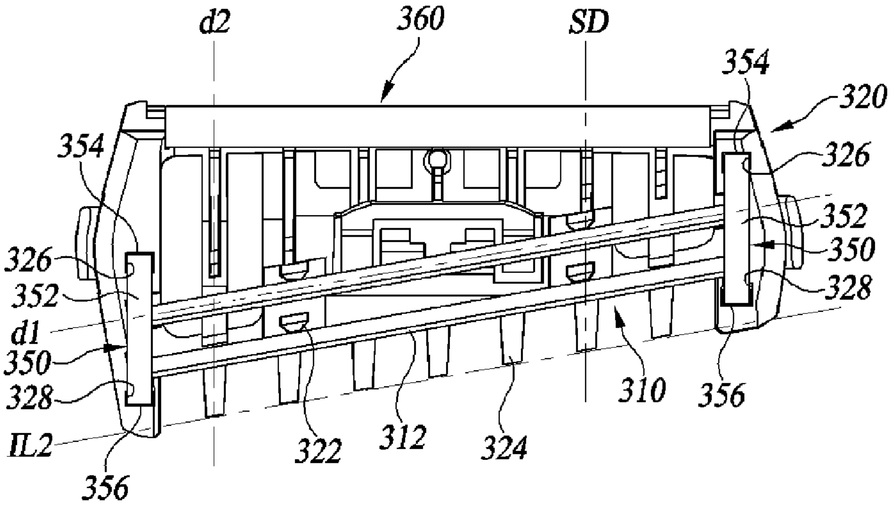
Figure 18B:
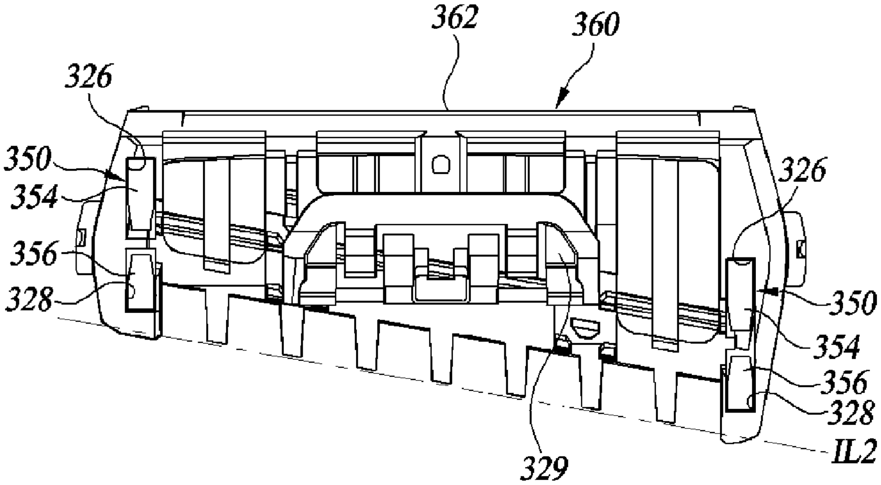

To be more specific, FIG. 17A and FIG. 18A are front views of the razor cartridge 30 from which the cap 330 and the plurality of comb elements 340 are removed, and FIG. 17B and FIG. 18B are bottom views of the razor cartridge 30 from which the cap 330 and the plurality of comb elements 340 are removed.

FIGS. 17A, 17B, 18A and 18B show modifications of the fixing method of the clip 350 according to the third embodiment of the present disclosure.

FIG. 17A and FIG. 17B illustrate a modification where one of two leg portions 354 and 356 of the clip 350 is inserted into the through hole, and the other leg portion is received in the mounting groove.

In a modification, the first leg portions 354 may be inserted into first through holes 326 formed in both sides of the receiving base 320. The first through holes 326 may be formed in back of the rearmost shaving blade 310 on both sides of the receiving base 320.

At least portions of the second leg portions 356 may be received in the mounting grooves 327 formed in both sides of the receiving base 320. The mounting grooves 327 may be formed in front of the first through holes 326, for instance, in the front end of the receiving base 320.

In a state where the first leg portion 354 is inserted into the first through hole 326, the free end of the first leg portion 354 may be bent to surround the bottom surface of the receiving base 320. Further, in a state where at least a portion of the second leg portion 356 is received in the mounting groove 327, the free end of the second leg portion 356 may be bent to surround the bottom surface of the receiving base 320.

On the other hand, although FIG. 17A and FIG. 17B show that the first leg portion 354 is inserted into the through hole and at least a portion of the second leg portion 356 is received in the mounting groove, the present disclosure is not limited thereto.

For example, the second leg portion 356 may be inserted into the through hole, while at least a portion of the first leg portion 354 may be received in the mounting groove. In this case, the through holes may be formed in front of the foremost shaving blade 310 on both sides of the receiving base 320, and the mounting groove may be formed behind the through hole, e.g. in the rear end of the receiving base 320.

FIGS. 18A and 18B show another modification where two leg portions 354 and 356 of the clip 350 are inserted into the through holes.

The first leg portions 354 may be inserted into the first through holes 326 formed in both sides of the receiving base 320. The first through holes 326 may be formed in back of the rearmost shaving blade 310 on both sides of the receiving base 320.

The second leg portions 356 may be inserted into the second through holes 328 formed in both sides of the receiving base 320. The second through holes 328 may be formed in front of the foremost shaving blade 310 on both sides of the receiving base 320.

In a state where the first leg portion 354 is inserted into the first through hole 326, the free end of the first leg portion 354 may be bent to surround the bottom surface of the receiving base 320. Further, in a state where the second leg portion 356 is inserted into the second through hole 328, the free end of the second leg portion 356 may be bent to surround the bottom surface of the receiving base 320.

The modifications shown in FIGS. 17A, 17B, 18A and 18B are only some of various modifications of the clip 350 according to the third embodiment of the present disclosure. Therefore, the fixing method of the clip 350 according to the third embodiment of the present disclosure is not limited to the modifications shown in FIGS. 17A, 17B, 18A and 18B.

For example, both the first leg portion 354 and the second leg portion 356 may be configured to be received in the mounting grooves. In this case, two mounting grooves may be formed, respectively, on the front end and the rear end of the receiving base 320.

FIG. 19 is a sectional view taken along a direction XIX-XIX' of FIG. 16 to show the razor cartridge 30 according to the third embodiment of the present disclosure.

The cutting edge 312 of each of the shaving blades 310 may have the same protrusion value with respect to the shaving plane SP.

The cutting edge 312 of each of the shaving blades 310 may have a negative protrusion value with respect to the shaving plane SP. In this case, the protrusion value of the cutting edge 312 may be set differently depending on the length of the hair that is to be left through the stubble shaving.

In this connection, various kinds of caps 330 having different distances between the cutting edge 312 and the top surface 344 may be provided. For instance, a 3 mm-cap 330 in which the distance between the cutting edge 312 and the top surface 344 is 3 mm, and a 5 mm-cap 330 in which the distance between the cutting edge 312 and the top surface 344 is 5 mm may be provided.

The cap 330 may be detachably attached to the receiving base 320 to be replaced with another one. In this case, a user may detach an existing cap 330 from the receiving base 320, and then attach the cap 330 corresponding to a desired hair length to the receiving base 320.

On the other hand, in order to make proper stubble shaving, it is necessary to space a user's skin and the cutting edge 312 by a predetermined distance during shaving. Therefore, the distance between the top surface 344 and the cutting edge plane CP may be 1.0 mm or more. In this case, the cutting edge 312 may have a negative protrusion value of −1.0 mm or less.

In order to prevent ponding from occurring in the space between the comb element 340 and the cutting edge 312 and prevent the rust of the shaving blade 310 from being generated, the cutting edge 312 and the bottom surface 342 of the comb element 340 adjacent thereto may be spaced apart from each other by a predetermined distance N. The distance N between the cutting edge 312 and the bottom surface 342 adjacent thereto may vary depending on the kind of the cap 330.

For example, in the case of the 2 mm-cap or the 3 mm-cap, the distance N between the cutting edge 312 and the bottom surface 342 adjacent thereto may range from 0.45 mm to 0.55 mm, and preferably be 0.50 mm.

Further, in the case of the 1 mm-cap, the distance N between the cutting edge 312 and the bottom surface 342 adjacent thereto may range from 0.1 mm to 0.3 mm, and preferably be 0.2 mm.

Furthermore, in the case of 5 mm-cap, the distance N between the cutting edge 312 and the bottom surface 342 adjacent thereto may range from 1.65 mm to 2.65 mm, and preferably be 2.15 mm.

However, the present disclosure is not limited thereto. In various kinds of caps 330, the distance N between the cutting edge 312 and the bottom surface 342 adjacent thereto may have values other than the above-described range.

On the other hand, the trimming blade 360 may be supported between the receiving base 320 and the cap 330. For example, both sides of the base portion 364 of the trimming blade 360 may be supported by the rear end of the receiving base 320 and the rear end of the cap 330, or be supported by the top surface of the receiving base 320 and the bottom surface of the cap 330. Thus, the trimming blade 360 may be fixed to the blade housing 32. At this time, a direction in which the trimming edge 362 faces may be opposite to a direction in which the cutting edge 312 of the shaving blade 310 faces. For example, the trimming edge 362 may face the bottom surface of the receiving base 320.

The trimming blade 360 may be fixed by simply attaching the cap 330 to the receiving base 320 after the trimming blade 360 is disposed on the rear end of the receiving base 320 or the top surface of the receiving base 320. Therefore, the razor cartridge 30 according to the third embodiment of the present disclosure can fix the trimming blade 360 to the blade housing 32 without a separate fixing process or a separate fixing member.

However, the present disclosure is not limited thereto, and the trimming blade 360 may be fixed to the blade housing 32 through methods other than the above-described method. For example, the trimming blade 360 may be fixed to the blade housing 32 using a separate fixing member or through bonding or fusion.

A fourth embodiment of the present disclosure shown in FIG. 20, which will be described later, is different from the embodiment of the present disclosure shown in FIGS. 1 to 11 in that at least one shaving blade is arranged to be parallel to the longitudinal direction of the receiving base. Hereinafter, unique characteristics according to the fourth embodiment of the present disclosure will be mainly described, and a duplicated description of components which are substantially equal to those of the embodiment of the present disclosure will be omitted.

Figure 20:
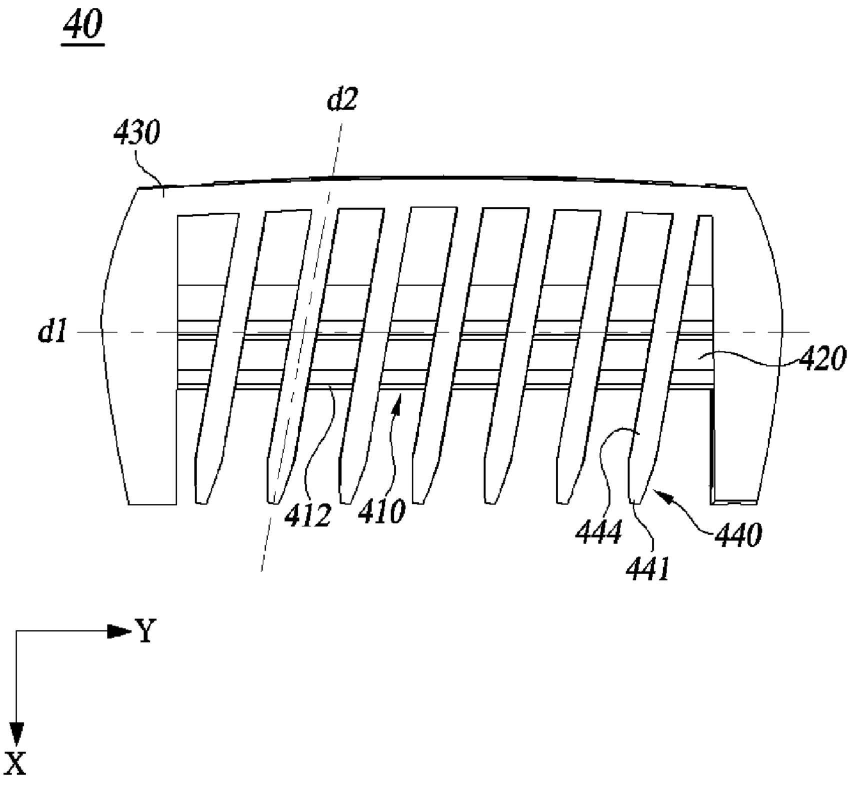
FIG. 20 is a front view illustrating the razor cartridge according to a fourth embodiment of the present disclosure.

FIG. 20 is a front view illustrating a razor cartridge 40 according to a fourth embodiment of the present disclosure.

Referring to FIG. 20, a first direction d1 in which at least one shaving blade 410 is arranged may be parallel to the longitudinal direction that is the extension direction of the receiving base 420. Further, a second direction d2 in which a plurality of comb elements 440 extend may not be perpendicular to the longitudinal direction of the receiving base 420.

Here, the longitudinal direction of the receiving base 420 refers to a direction in which the receiving base 420 extends. For example, the longitudinal direction of the receiving base 420 may be parallel to a Y-axis in FIG. 20.

The razor cartridge 40 according to the fourth embodiment of the present disclosure has a technical feature that a plurality of comb elements 440 are diagonally arranged, instead of a shaving blade 410.

In this case, the hair entering between the plurality of comb elements 440 may be arranged by the plurality of comb elements 440. At this time, the hair may be arranged in the second direction d2 by the plurality of comb elements 440.

The hair arranged in the second direction d2 may diagonally contact at least one shaving blade 410, thus achieving effective stubble shaving.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

CROSS-REFERENCE TO RELATED APPLICATIONS

The application claims priority to Korean Patent Applications No. 10-2020-0029704, filed Mar. 10, 2020, and No. 10-2021-0000763, filed Jan. 5, 2021, the disclose of which is incorporated herein by reference.

| REFERENCE NUMERALS | |
|---|---|
| 10: razor cartridge | 12: blade housing |
| 14: washing hole | 110: shaving blade |
| 112: cutting edge | 114: base portion |
| 116: edge portion | 120: receiving base |
| 122: receiving protrusions | 124: teeth |
| 130: cap | 140: comb elements |
| 141: head portion | 142: bottom surface |
| 144: top surface | 243: front combs |
| 245: rear combs | 247: middle combs |
| 350: clips | 360: trimming blade |
| SP: shaving plane | PL: normal line |
| BL: extension direction of the base portion | |
| EL: extension direction of the cutting edge | |
| CP: cutting edge plane | |

What is claimed is:

1. A razor cartridge comprising:

at least one shaving blade comprising a base portion and an edge portion that is bent with respect to the base portion and comprises a cutting edge;

a receiving base configured to receive the at least one shaving blade such that a length of the at least one shaving blade is arranged in a first direction, the receiving base comprising a cap-facing surface, the cap-facing surface configured to receive the base portion of the at least one shaving blade, and a cap covering at least a portion of the receiving base, the cap comprising a third surface disposed behind the at least one shaving blade and a plurality of comb elements, each defining a longitudinal axis, that collectively define a second direction that is non-orthogonal to the first direction, each of the plurality of comb elements comprising:

a first surface facing the cap-facing surface of the receiving base, a second surface comprising a skin facing portion and a forward portion opposing the skin facing portion, the skin facing portion opposing the first surface, the forward portion disposed in front of the at least one shaving blade, the skin facing portions of the second surfaces of the plurality of comb elements defining a shaving plane, the first surfaces coupled to both of the forward portions and the third surface, and the first surfaces, the forward portions, the third surface, and the cap-facing surface defining at least one receiving hole through which the at least one shaving blade passes, wherein the plurality of comb elements define a plurality of inter-element openings between neighboring ones of the comb elements, each inter-element opening having a front-facing open end at least partially defined by the forward portions of the second surfaces of the neighboring comb elements, and wherein each of the forward portions includes a fourth surface facing the same direction as the first surfaces, and wherein widths of the fourth surfaces measured in the second direction are different from each other.

2. The razor cartridge of claim 1, wherein the receiving base has a longitudinal axis in the first direction.

3. The razor cartridge of claim 1, wherein the forward portions of the second surfaces of the neighboring comb elements are disposed on a first imaginary straight line that is not perpendicular to the second direction.

4. The razor cartridge of claim 1, wherein the at least one shaving blade comprises a plurality of shaving blades arranged side by side.

5. The razor cartridge of claim 1, wherein the at least one shaving blade comprises a first shaving blade and a second shaving blade, and a distance between the cutting edge of the first shaving blade and the cutting edge of the second shaving blade is greater than a distance between the second surface and the cutting edge of the first shaving blade.

6. The razor cartridge of claim 1, further comprising:

at least one washing hole passing through the third surface.

7. The razor cartridge of claim 1, wherein the widths of the fourth surfaces increase in a direction perpendicular to the second direction.

8. The razor cartridge of claim 1, wherein the cap-facing surface of the receiving base comprises a plurality of pairs of receiving protrusions each pair facing each other and disposed adjacent to the at least one shaving blade, wherein each pair of the plurality of pairs of receiving protrusions is spaced apart to define a gap therebetween, the gap extending in the second direction, and wherein the gaps of the plurality of pairs of receiving protrusions define a first portion of the at least one receiving hole.

9. The razor cartridge of claim 8, wherein the first surface comprises a recessed portion extending vertically toward the skin facing portion of the cap, and wherein the recessed portions of the first surfaces of the plurality of comb elements define a second portion of the at least one receiving hole opposing the first portion and shaped to accommodate at least the edge portion of the at least one shaving blade.

10. The razor cartridge of claim 9, wherein the at least one shaving blade is taller than the receiving protrusions such that each protrusion pair faces the base portion of the at least one shaving blade.

* * * * *